Dec. 3, 1963   H. O. BENTLEY   3,112,550
METHOD AND APPARATUS FOR STRIPPING
YARNS OR THREADS FROM BOBBINS
Filed April 22, 1960   10 Sheets-Sheet 1

INVENTOR.
HARRY O. BENTLEY
BY
ATTORNEYS

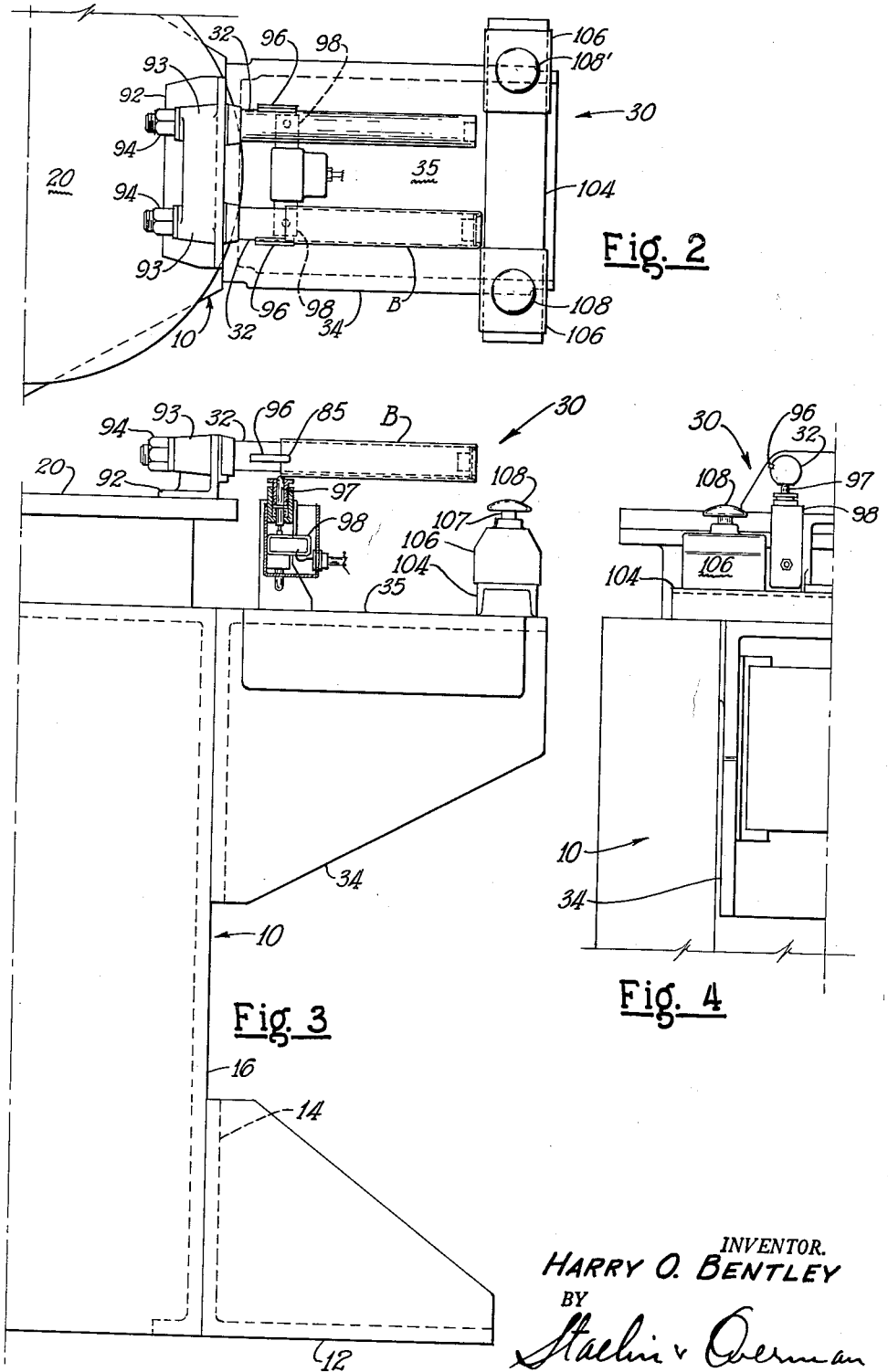

INVENTOR.
HARRY Q. BENTLEY
BY
*Stachie & Overman*
ATTORNEYS

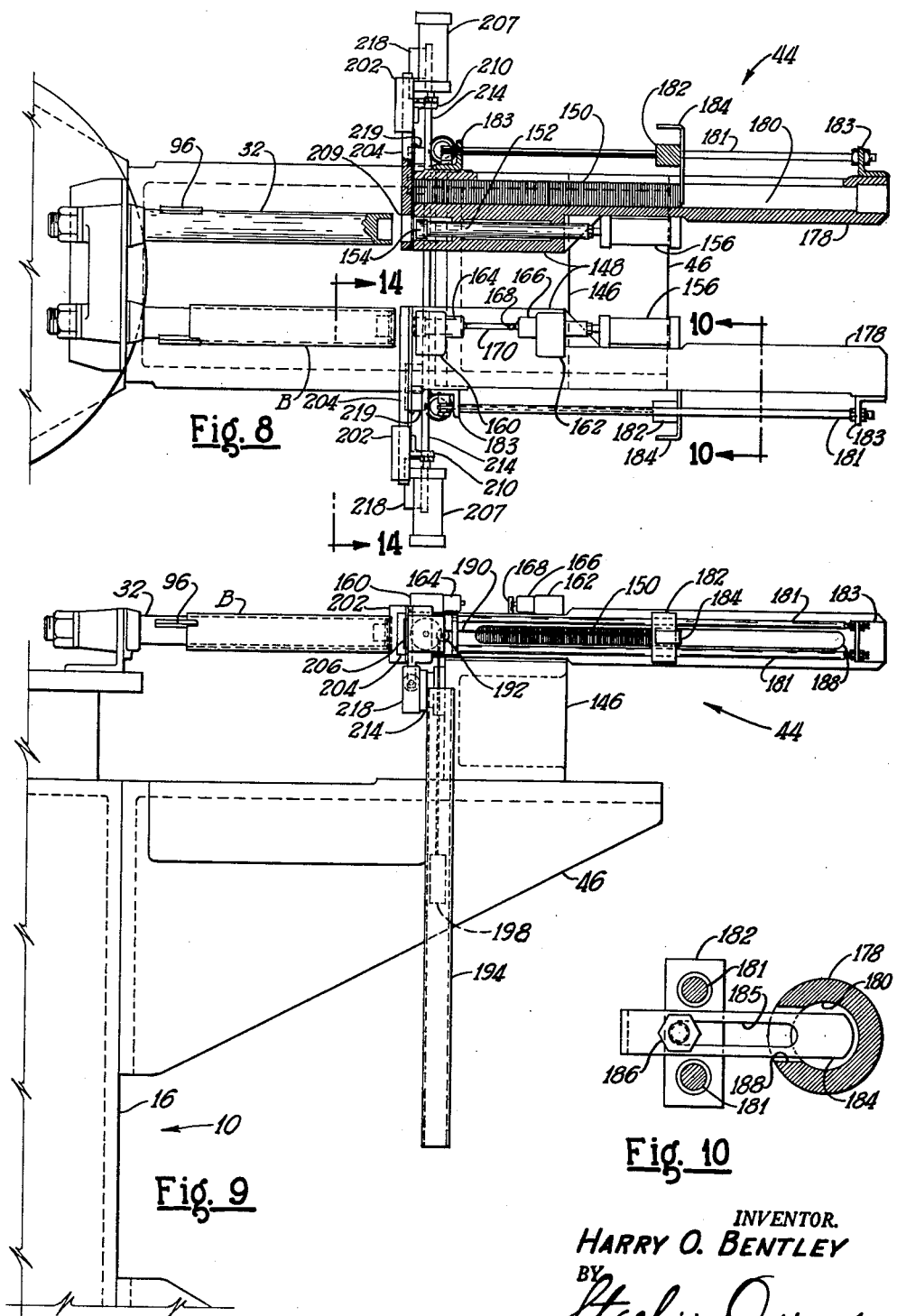

Dec. 3, 1963  H. O. BENTLEY  3,112,550
METHOD AND APPARATUS FOR STRIPPING
YARNS OR THREADS FROM BOBBINS
Filed April 22, 1960  10 Sheets-Sheet 5
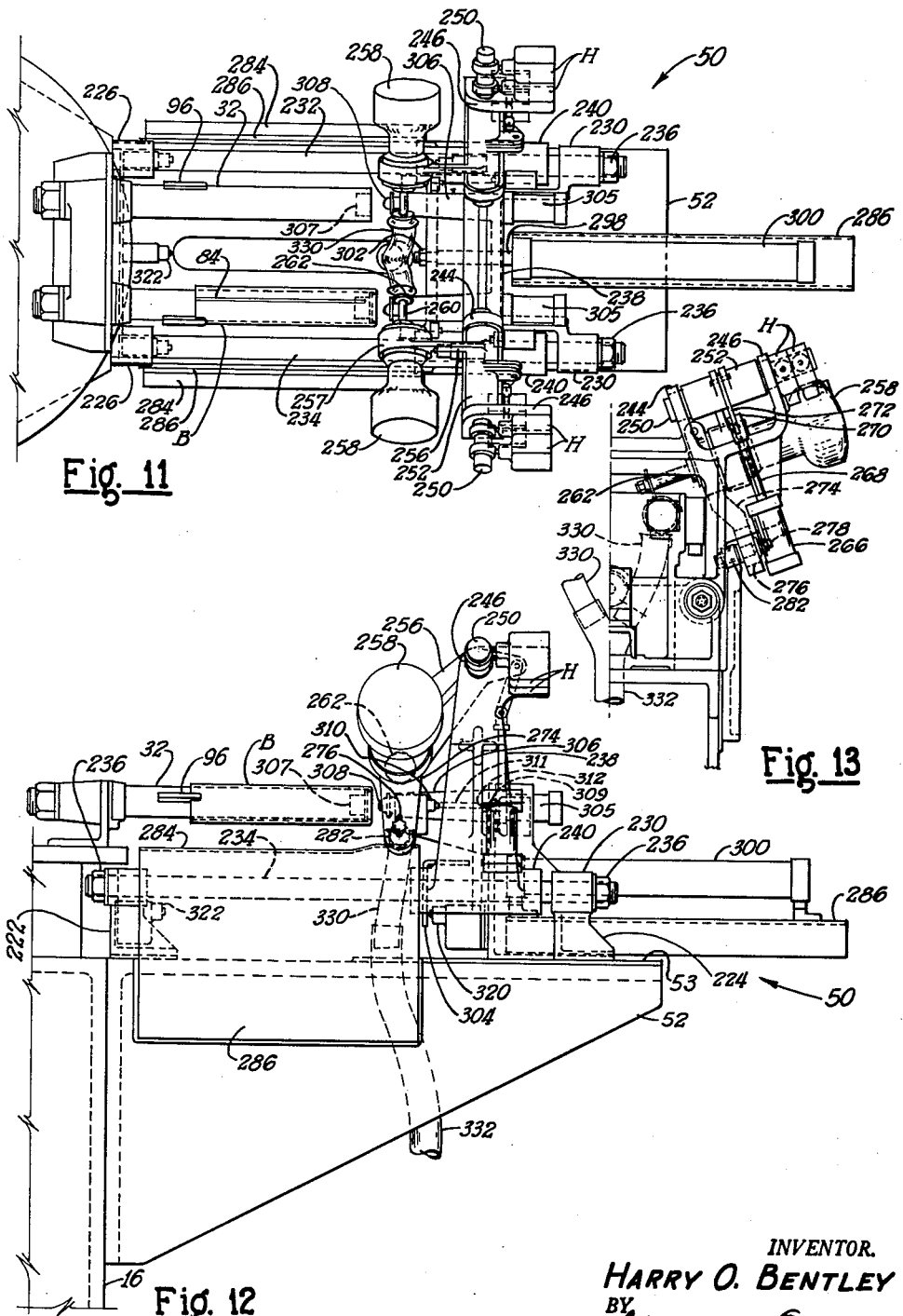
INVENTOR.
HARRY O. BENTLEY
BY
ATTORNEYS Dec. 3, 1963    H. O. BENTLEY    3,112,550
METHOD AND APPARATUS FOR STRIPPING
YARNS OR THREADS FROM BOBBINS
Filed April 22, 1960    10 Sheets-Sheet 6

INVENTOR.
HARRY O. BENTLEY
BY
ATTORNEYS

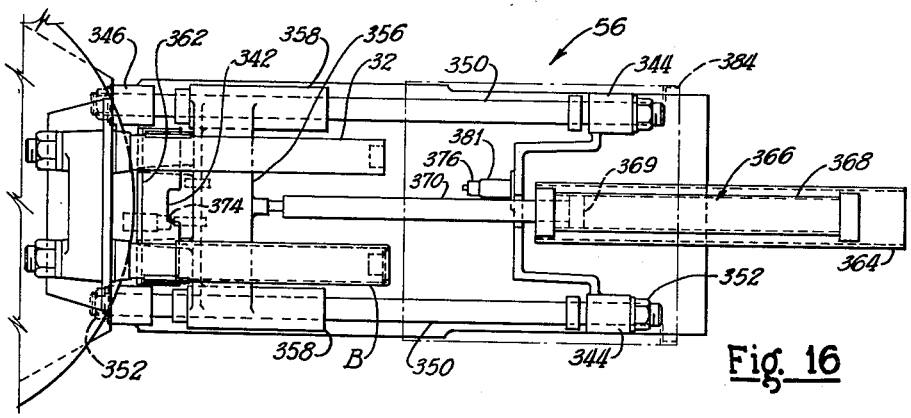
Fig. 16
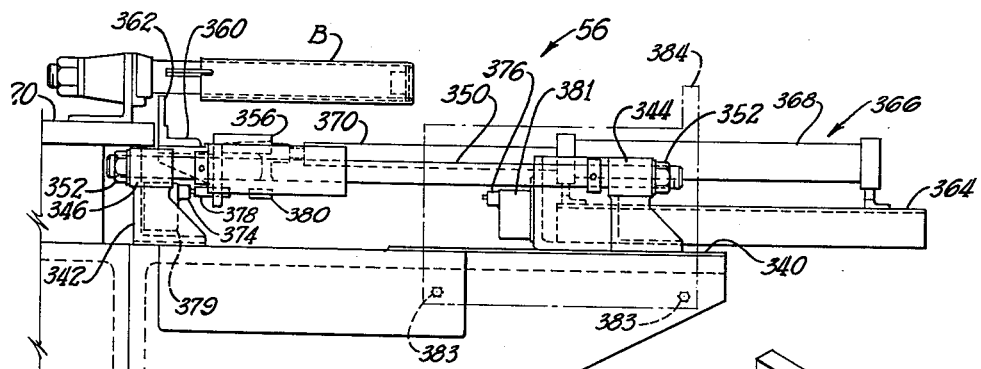
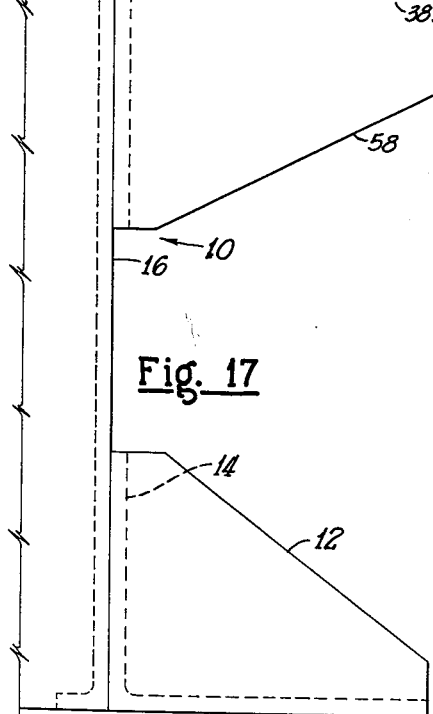
Fig. 17
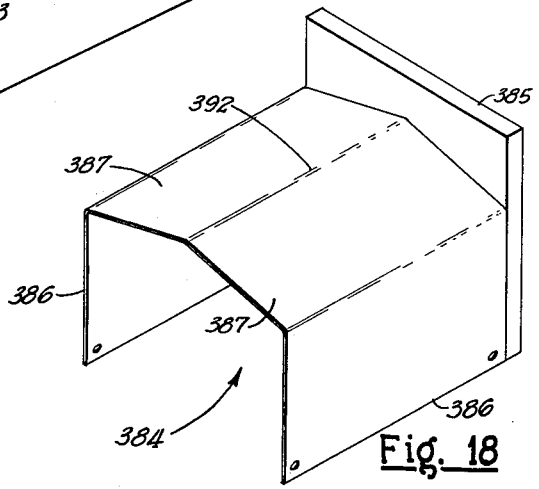
Fig. 18
INVENTOR.
HARRY O. BENTLEY
BY
ATTORNEYS

INVENTOR.
HARRY O. BENTLEY
ATTORNEYS

INVENTOR.
HARRY O. BENTLEY
BY
ATTORNEYS

INVENTOR.
HARRY O. BENTLEY
BY
ATTORNEYS

United States Patent Office 3,112,550
Patented Dec. 3, 1963

3,112,550
METHOD AND APPARATUS FOR STRIPPING YARNS OR THREADS FROM BOBBINS
Harry O. Bentley, Cumberland, R.I., assignor to Owens-Corning Fiberglas Corporation, a corporation of Delaware
Filed Apr. 22, 1960, Ser. No. 24,133
12 Claims. (Cl. 28—19)

This invention relates to a method of and apparatus for rapidly and effectively removing residue of textile yarns or filamentary materials from bobbins.

In the utilization of yarns or threads for fabricating textiles preparatory to weaving operations, the warp yarns or threads are wound onto a back beam from a creel containing a large number of bobbins providing the supply of warp yarns or threads. It is essential in textile weaving operations to provide continuous yarns or threads, and it is a practice to remove all of the nearly empty spools at one time and replace them with full bobbins, as it is uneconomical to stop the beam winding operation at short intervals to replace nearly empty bobbins, while others have substantial amounts of yarn remaining thereon.

The supplies of yarn on full bobbins are not uniform and hence at the time the beam winding operation is interrupted to change the bobbins, varying amounts of yarn remain on the spent or nearly empty bobbins.

Heretofore it has been the practice to manually remove the residue yarn on the nearly empty bobbins by severing the convolutions of yarn by manually drawing a knife lengthwise of the bobbin, such operation usually requiring several strokes of the knife in order to remove all of the yarn. Yarns or threads, formed of glass filaments or fibers are particularly difficult to sever in this fashion.

Moreover the severing knife necessarily engages the core or material of the bobbin and the core becomes badly scored particularly as it is subjected to repeated stripping operations. The scoring of the bobbin core results in a rough surface upon which the yarn is initially wound in filling the bobbin and such condition ofttimes results in breaking the yarn during winding. It is therefore a conventional practice to replace the spools on the creel before all of the yarn or thread has been unwound from the bobbin. Such bobbins, containing varying amounts or residue of yarn or thread are returned to the yarn supplier for refilling or repackaging.

Each yarn-filled bobbin is provided at one end with a removable disc, usually formed of paper board, which identifies the size or characteristics of the yarn or thread wound on the bobbin. In rewinding or repackaging, the disc must be removed by hand and a proper identifying disc inserted. The yarn types and sizes may be identified by discs of different colors or by code numbers on the discs. Thus, the yarn supplier must recondition the bobbins by removing the unused yarn or thread and the identifying disc and replace the disc prior to refilling or winding the bobbin with yarn or thread.

The present invention embraces a method of and apparatus for effectively and efficiently removing unused yarn, thread or filamentary material from bobbins or spools without scoring or damaging the bobbins or spools.

An object of the invention resides in the provision of a method of reconditioning bobbins by removing yarn identifying discs, replacing new discs in the bobbins and rapidly removing residual yarn on the bobbins and conveying away the waste yarn wherein such operations are carried on automatically in a minimum amount of time.

An object of the invention resides in an apparatus involving a movable member or turret equipped with a plurality of pairs of bobbin carriers movable successively to a plurality of stations at which operations are performed to condition the bobbins to be rewound with yarn or filamentary material to form yarn packages.

Another object of the invention resides in an apparatus for performing conditioning operations upon yarn bobbins wherein a revoluble member or table supports multiple sets of bobbin carriers, the several operations being performed concomitantly on groups of bobbins indexed by movement of the member or table to successive stations or positions whereby a substantial number of bobbins are concomitantly subjected to successive operations thereby reducing the cost of conditioning bobbins for subsequent refilling.

Another object of the invention resides in a bobbin conditioning apparatus which effectively and efficiently performs operations upon the bobbins and severs unused yarn therefrom without damage to the bobbins thereby rendering the bobbins capable of long life.

Another object of the invention resides in an apparatus involving a movable table provided with a plurality of sets of bobbin carriers movable successively to various stations at which operations are to be performed in conjunction with means individual to each station electrically or mechanically interlocked whereby indexing movement of the table and bobbin carriers is prevented until the operations performed at the several stations are completed.

Another object of the invention resides in a bobbin stripping apparatus which is adaptable to receive bobbins of various character and size by adjusting the instrumentalities for performing the several operations to remove unused filamentary material from the bobbins and recondition the bobbins.

Another object of the invention is the provision of means for securing the bobbins on mandrels during the performance of the several operations in conjunction with means for preventing the initiation or interrupting the performance of operations in event any bobbin is improperly disposed on a mandrel.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 2 is a top plan view of the station at which the bobbins are mounted upon mandrels of a bobbin carrier;

FIGURE 3 is an elevational view of the structure shown in FIGURE 2;

FIGURE 4 is an end view of a portion of the construction shown in FIGURE 3;

FIGURE 8 is a top plan view of the disc applying station, certain parts being shown in section;

FIGURE 9 is a side elevational view of the arrangement shown in FIGURE 8;

FIGURE 10 is an enlarged detail sectional view taken substantially on the line 10—10 of FIGURE 8.

FIGURE 11 is a top plan view illustrating a stripping apparatus or station showing dual units for removing unused yarn from two bobbins simultaneously;

Figure 14:
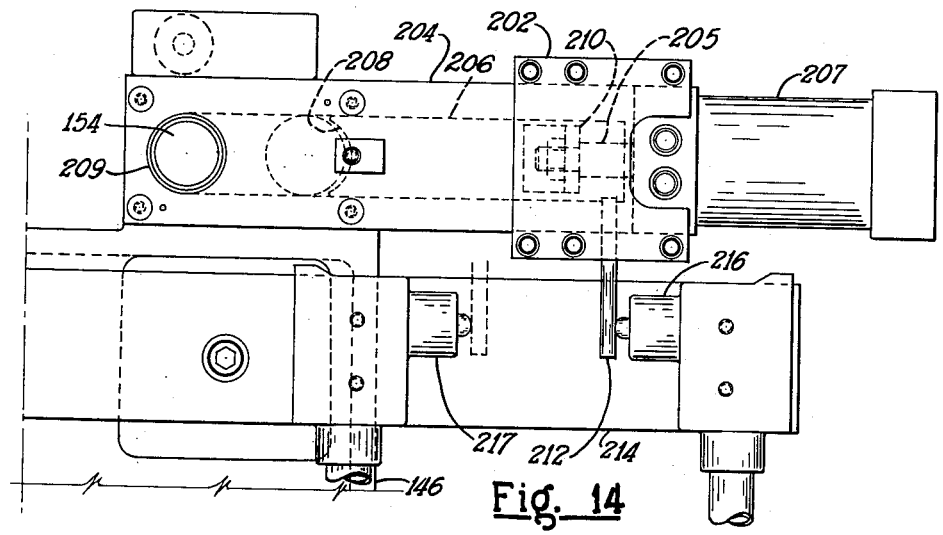
Figure 15:
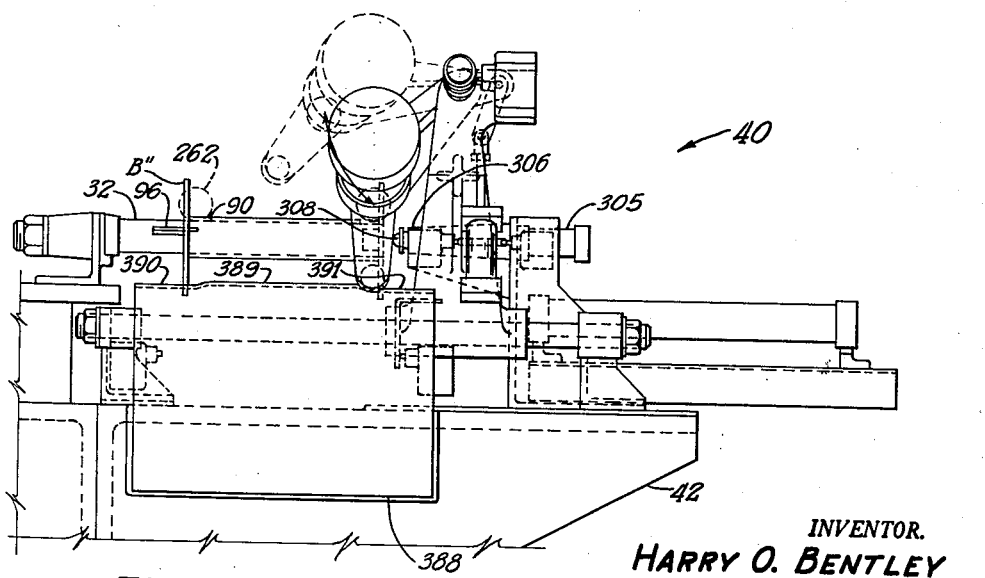
Figure 19:
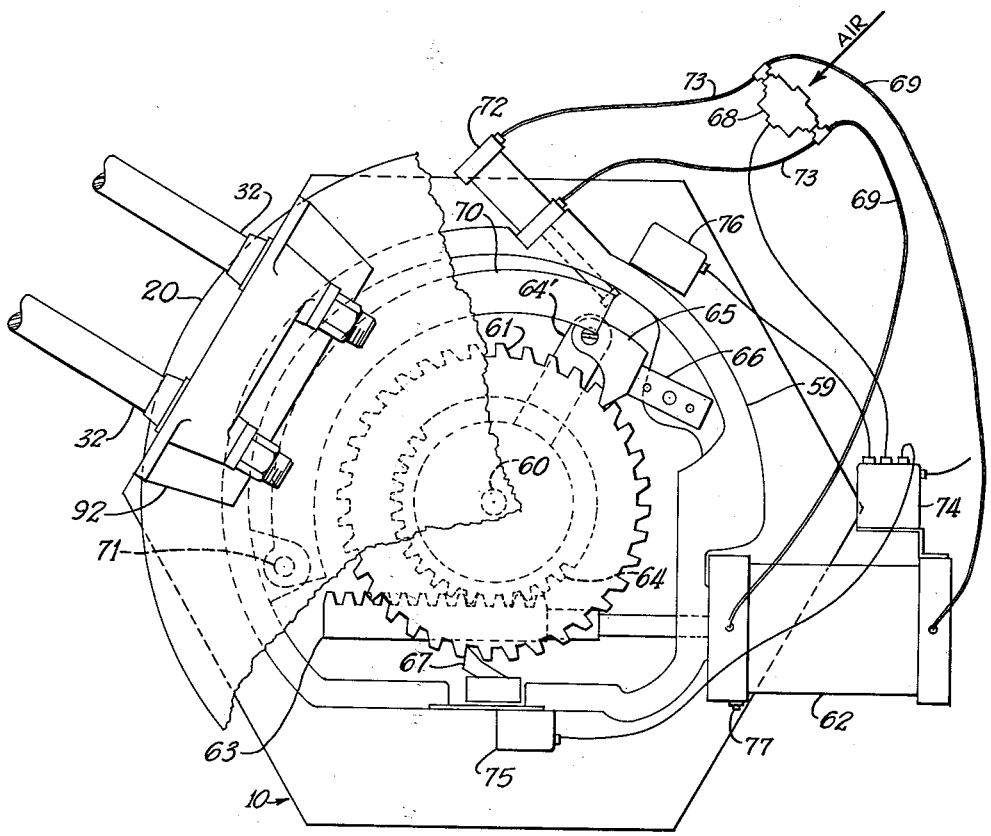
Figure 20:
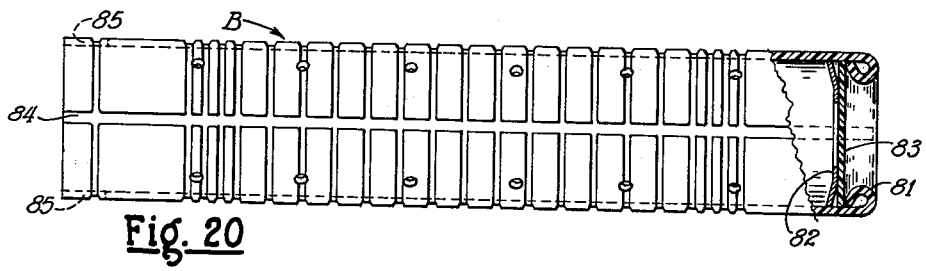
Figure 21:
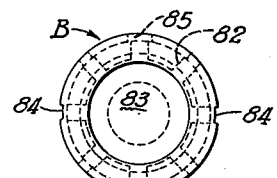
Figure 22:
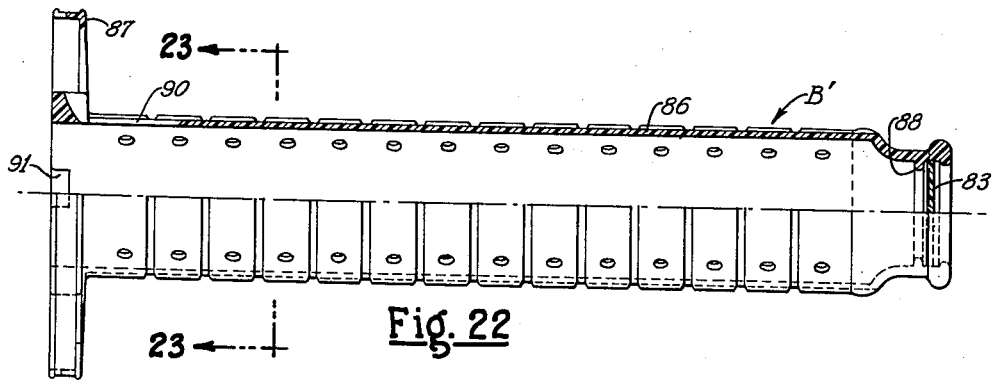
Figure 23:
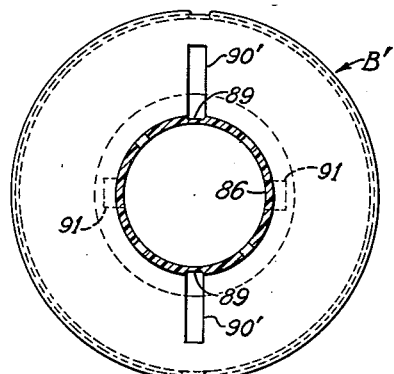
Figure 24:
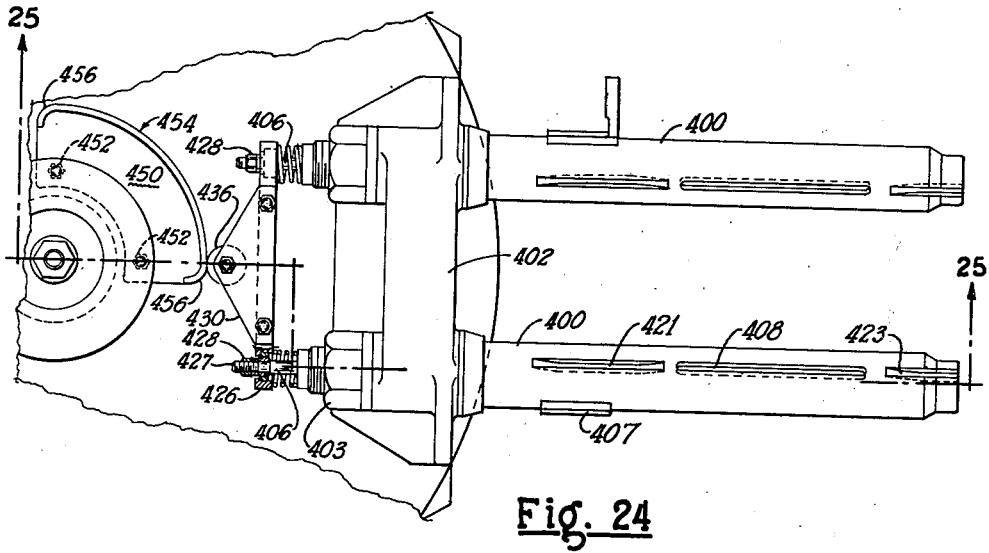
Figure 25:
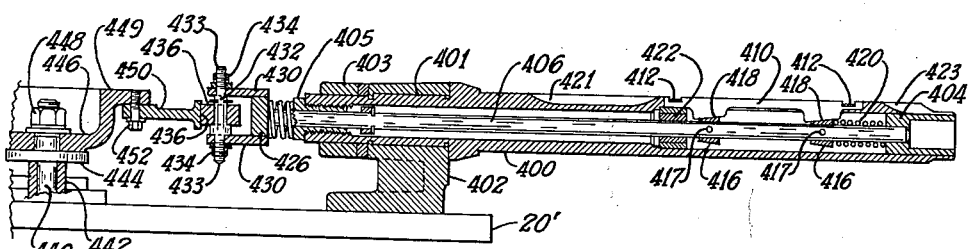
Figure 26:
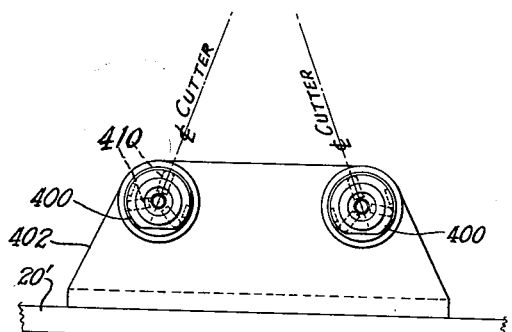

FGURE 12 is a side elevational view of the construction illustrated in FIGURE 11;

FIGURE 13 is an end view of one of the yarn stripping units illustrated in FIGURE 11;

FIGURE 14 is an enlarged detail view taken substantially on the line 14—14 of FIGURE 8;

FIGURE 15 is an end view of one of the yarn stripping units of a secondary station illustrated as utilized for removing unused yarn from bobbins having flanged ends;

FIGURE 16 is a top plan view of the arrangement at the bobbin unloading station for removing the stripped bobbins from the carrier;

FIGURE 17 is a side elevational view of the construction shown in FIGURE 17;

FIGURE 18 is an isometric view of a baffle for deflecting the yarn-free reconditioned bobbins away from the bobbin carrier;

FIGURE 19 is a top plan view of the rotatable table supporting the bobbin-receiving mandrels, portion of the table being broken away to illustrate the indexing mechanism;

FIGURE 20 is an elevational view, partly in section, illustrating one form of bobbin adapted to be accommodated on the yarn stripping apparatus of the invention;

FIGURE 21 is an end view of the bobbin shown in FIGURE 20;

FIGURE 22 is an elevational view, partly in section illustrating another form of bobbin adapted to be accommodated on the yarn stripping apparatus;

FIGURE 23 is a sectional view taken substantially on the line 23—23 of FIGURE 22;

FIGURE 24 is a top plan view showing a modified form of mandrel construction with releasable clutch means for retaining the bobbins on the mandrels;

FIGURE 25 is a longitudinal sectional view of the arrangement shown in FIGURE 24, and FIGURE 26 is an end view of the construction shown in FIGURE 24.

While the arrangement illustrated is especially adaptable for carrying out the method of removing unused or residue yarn from bobbins and reconditioning the bobbins preparatory to winding yarn thereon and more especially for use in removing yarns formed of glass fibers or filaments from bobbins, it is to be understood that the method and apparatus of the invention may be utilized in stripping other filamentary materials from bobbins, spools or cores, wherever the same may be found to have utility.

The arrangement disclosed embodies high speed rotary yarn severing means or discs which are especially adapted for severing the convolutions of glass fiber yarns, threads or strands from bobbins of various types, some of which are plain tubes, while other are fashioned with end flanges.

Figure 1:
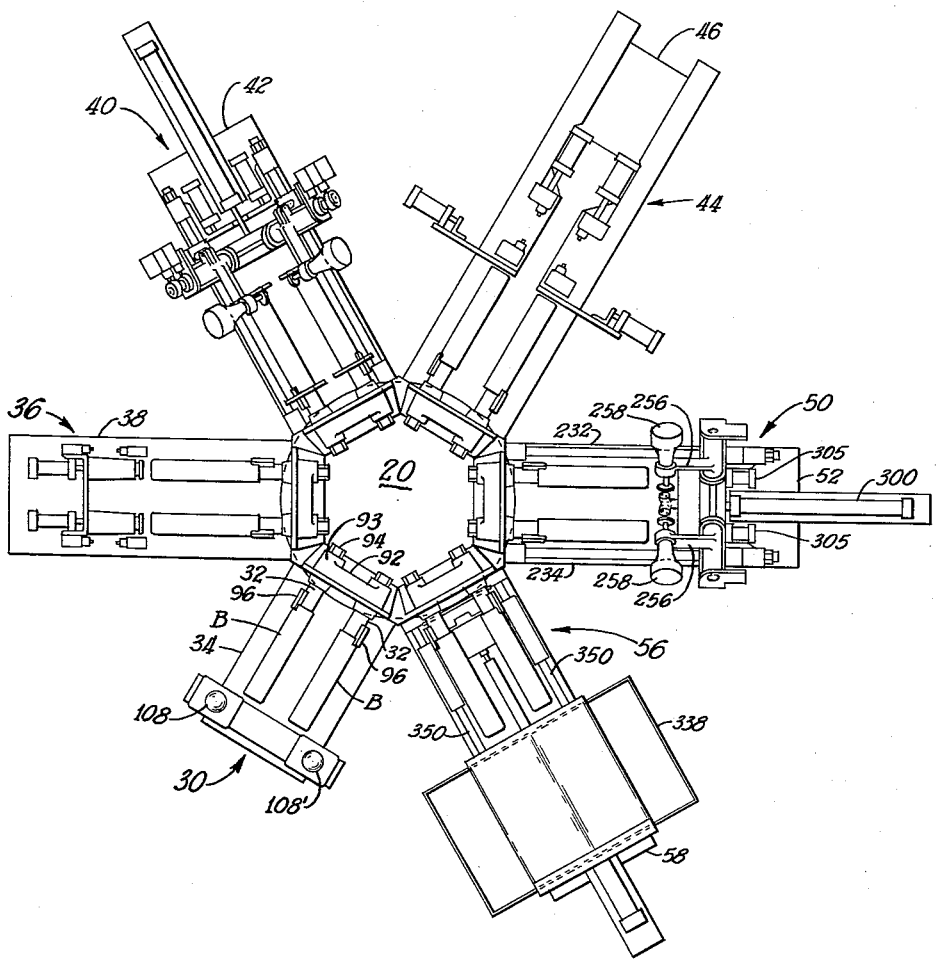
FIGURE 1 is a top plan view of a form of novel apparatus adapted to perform steps in the method of the invention at several stations.

Referring to the drawings in detail, FIGURE 1 is a top plan view illustrating the rotatable table or turret forming the bobbin carrier and the apparatus disposed at the several stations for performing operations or steps in removing unused or residue yarn from bobbins or spools, removing yarn identifying discs and replacing same with other discs to condition the bobbins for subsequent packaging of yarn thereon.

The arrangement includes a frame 10 provided with outwardly projecting floor engaging pads 12 of U-shaped cross-section, the upwardly extending web 14 of each of the pads being secured to a central pedestal-like frame member 16.

The apparatus at each station is supported upon a member secured to the central pedestal frame portion 16 and extending outwardly therefrom. Journally supported by bearing means contained within the pedestal frame portion 16 is a revoluble table or turret 20 which supports a plurality of pairs of mandrels or arbors 32 which are adapted to receive and support bobbins during the performance of the operational steps herein described. The turret or rotatable table 20 is adapted to be rotated and indexed to successive operating positions by means hereinafter described.

With particular reference to FIGURE 1, the loading station is indicated at 30, at which the bobbins B containing varying quantities of unused yarn are mounted upon the mandrels 32, the latter being supported by the turret or table 20 in a manner hereinafter described. Components of the arrangement disposed at the loading station 30 are mounted upon a platform or extension 34 which is secured to the central frame member 16.

The arrangement includes a second station 36, at which the yarn or material identifying discs in the ends of the bobbins are removed, and is herein referred to as a de-discing station. The components at this station are supported upon a platform or extension 38 which is secured to the central frame member 16.

The third station indicated at 40 provides one set or pair of yarn stripping or severing units for severing yarns from bobbins. The components at station 40 are supported upon a platform or extension 42 which is secured to the frame member 16.

The fourth station indicated at 44 is equipped with means for affixing yarn identifying discs in the ends of the bobbins. The components of this mechanism are supported upon an extension or platform 46 which extends outwardly and is secured to the frame member 16.

The fifth station indicated at 50 provides a second set or pair of yarn stripping or severing units for stripping unused yarn from the bobbins which are substantially the same as the stripping units at station 40. The components at this station are supported upon an extension or platform 52 which is secured to the frame member 16.

The sixth station indicated at 56 provides an ejector mechanism for removing yarn-free reconditioned bobbins from the supporting mandrels or arbors 32. The components at this station are supported upon a platform or extension 58 which is secured to and projects outwardly from the frame member 16.

The electrically controlled, fluid pressure operated indexing mechanism for the table or turret 20 carrying the mandrels 32 is shown in plan view in FIGURE 19. The indexing mechanism includes a supplemental frame 59, shown in FIGURE 19, secured to and carried by the main frame or pedestal 16, shown in FIGURE 3, upon which is journalled a shaft 60 supporting the turret or table 20.

A ratchet wheel 61 is secured to the lower surface of the table 20, the table being journalled on the shaft 60. Secured to the supplemental frame 59 is a fluid actuator 62 which, in the embodiment illustrated, is a fluid actuated servo-motor of the cylinder and piston type.

The piston rod of the servo-motor is provided with a rack 63 which meshes with a toothed sector or quadrant gear 64. An arm 64' secured to the gear 64 carries an actuating pawl 65 which cooperates with the teeth of the ratchet wheel 61 to move the table through one sixth of a revolution at each cycle of movement of the servo-motor 62. A stop 66 mounted on the supplemental frame 59 is engaged by the actuating pawl 65 to limit or position each successive indexing movement of the table 20.

A holding pawl 67 prevents reverse movement of the ratchet wheel 61 and table 20 on the retracting strokes of the rack 63 so that the table is indexed in one direction of rotation. A solenoid actuated valve 68 controls flow of fluid into the respective ends of the fluid actuator or servo-motor 62 through the tubes 69 for reciprocating the rack 63.

A pawl holding shoe 70, shown in FIGURE 19, pivoted by a pin 71 carried by the supplemental frame 59 is controlled by a second fluid actuated servo-motor unit 72 for moving the shoe into and out of engagement with the actuating pawl 65. The flow of fluid under pressure through tubes 73 to the respective ends of the servo-motor 72 is controlled by the valve mechanism 68. A terminal or junction box 74 is mounted by the servo-motor 72 and is adapted to accommodate connections with interlocking microswitches and relay mechanisms associated with and actuated by various moving components of the several operating stations.

A switch 75 which is actuated by a cam (not shown) carried by the rack 63 is adapted to be closed at the full retracted position of the rack 63 to activate the solenoid controlled valve 68 whereby fluid under pressure is directed to the rear of the servo-motor 72 pivoting the shoe 70 into a position forcing the ratchet pawl 65 into engagement with a tooth of the ratchet wheel 61.

A member (not shown) is attached to the arm 64' carried by the gear 64 and actuates an impulse switch 76 in retracted position of the rack 63, the switch 76 being intercalated with circuits of the various operating components of the stations to synchronize or ready the operation of the indexing mechanism at the completion of all of the operations performed at the various stations. The servo-motor 62 is provided at its forward end with a fluid by-pass controlled by a member 77 which may be adjusted to retard movement of the rack 63 as the table approaches an indexed position to cushion, without impact, the engagement of the pawl 65 with the stop 66 at table indexed position.

One form of tubular bobbin or spool adapted to be accommodated by the yarn stripping apparatus is illustrated in FIGURES 20 and 21. The tubular bobbin B may be formed of molded resin or plastic with a comparatively thin wall. One end of the bobbin is formed with an inwardly extending circumferential bead 81 with a thin spring washer 82 disposed within the bobbin adjacent the bead 81. A yarn identifying disc 83 of cardboard or heavy paper is inserted in one end of the bobbin and is replaceable by means hereinafter described.

The disc 83 bears a color insignia or code number identifying the size, characteristics or other factor designating the yarn which is packaged upon the bobbin. The bobbin is formed with one or more, preferably two, longitudinal shallow grooves 84 to accommodate yarn severing means or cutters. The other end of the bobbin is provided with one or more open slots or notches 85 engageable with a positioning means on each of the mandrels.

FIGURES 22 and 23 illustrate another form of bobbin adapted to be accommodated by the yarn stripping apparatus. In this form the bobbin comprises a tubular body 86 having a lateral flange at one end. The opposite end is formed with a configuration to accommodate a yarn identifying disc 83, a ledge 88 forming a backing or support for the disc. The body 86 is formed with longitudinal shallow grooves 89 to accommodate yarn severing cutters. At the regions of the grooves adjacent the flange 87, the body is formed with slots 90 extending through the wall of the bobbin to enable the yarn severing wheel or cutter to remove the yarn adjacent the flange 87. The flange 87 is formed with slots 90' to provide clearance for the cutter. The flanged end of each bobbin is formed with open slots 91 to accommodate a positioning means on a supporting mandrel. The yarn stripping apparatus is also adapted to accommodate bobbins or spools with flanges at both ends.

In the embodiment illustrated and with particular reference to FIGURES 1 and 4, there are six pairs of arbors or mandrels 32 and a supporting bracket 92 provided for each pair. Each of the brackets or mandrel supports 92 is secured to the turret or table 20 by bolts or other suitable means.

Each bracket 92 is formed with two boss portions 93 bored to receive tenon portions formed on the mandrels 32, the extremities of the tenon portions being threaded to receive securing nuts 94.

Through this arrangement the mandrels 32 are rigidly mounted upon the turret or table 20 and adapted to rotate with the table, the mandrels extending generally radially from the table. The several pairs of mandrels 32 are mounted upon brackets 92 circumferentially spaced on the table or turret 20 in the manner shown in FIGURE 1.

All of the mandrels are of identical construction and each pair of mandrels extend generally radially outwardly from the table 20. The six operational stations are equally spaced circumferentially so that each indexing movement of the table 20 will bring the succeeding pair of mandrels into proper position at the next station. The table 20, at each indexing movement, moves through a circumferential angle of sixty degrees.

The components of the loading station are shown in FIGURES 1 through 4. Disposed adjacent the mandrels 32 at the loading station is a control means in the form of a normally open switch mechanism which prevents any indexing movement of the turret or table 20 until bobbins B are properly telescoped onto the mandrels. FIGURE 2 illustrates one mandrel 32 without a bobbin, the other supporting a bobbin. For purposes of simplifying illustration, the residue of yarn carried by most of the bobbins has been omitted from the drawings.

Each of the mandrels 32 is provided with a key or feather 96 which is adapted to be received in the slot 85 of a bobbin B shown in FIGURES 21 and 22, or a slot 91 of the bobbin B'; when the bobbin is telescoped onto and in proper position on the mandrel as shown in FIGURES 2 and 3. With the bobbin in proper position on the mandrel, the end region of the bobbin adjacent the key 96 will engage and depress a plunger 97 of a microswitch 98 closing the switch to ready the circuit controlling the table indexing mechanism.

A plunger 97 is disposed beneath each of the mandrels 32 so that both mandrels must be provided with bobbins disposed in a proper position in engagement with the key 96 before indexing operations may be initiated. The plungers 97 are normally resiliently biased to extend into the path of a bobbin B so that the completion of the position of a bobbin on the mandrel depresses the plunger 97 closing the microswitch 98 interlocked in the indexing mechanism control circuit.

Figure 7:
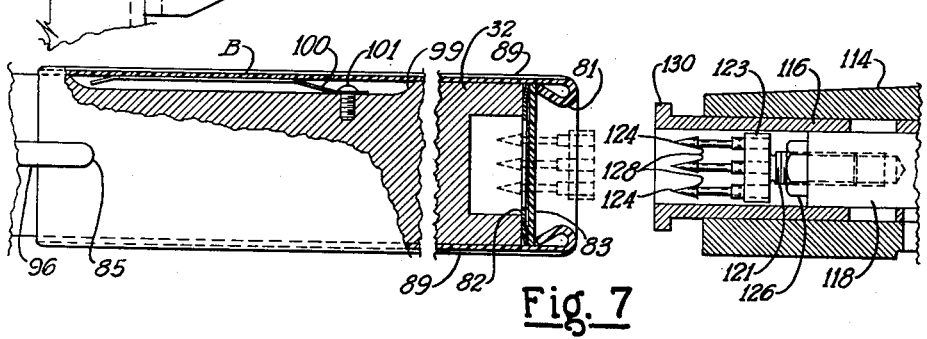
FIGURE 7 is an enlarged detail sectional view illustrating the arrangement for removing yarn identifying discs from the ends of bobbins.

One form of means for frictionally retaining the bobbins on the mandrels 32 is shown in FIGURE 7. The mandrel 32 is formed with one or more longitudinal recesses 99 in each of which is disposed a flexible or spring plate 100 secured to the mandrel by a screw 101 or other suitable means. The spring plate 100 is inherently stressed outwardly of the mandrel to contact the interior surface of a bobbin and frictionally retain the bobbin in proper position during successive operations.

As hereinafter explained, the mechanisms at the other stations are provided with interlocking electric controls so that each operation must be completed before the table 20 can be indexed.

The arrangement includes two spaced manually operable switch means which must be actuated by both hands of the operator before an indexing movement can be effected. As shown in FIGURES 2 through 4, a channel shaped member 104 is mounted upon the end region of the horizontal portion 35 of the platform 34. Mounted on each end region of the member 104 is a housing 106 containing a manually operated circuit closing switch. Each of said switches is provided with a plunger 107 and each of the plungers equipped with a knob or button 108 and 108' for actuation by the operator.

The closing of the switches controlled by the buttons 108 and 108', providing all the other operations have been completed and the circuits readied through suitable microswitches, initiates or energizes the indexing mechanism to move the table 20 to shift all of the pairs of mandrels to the succeeeding operational stations.

In the operation of the indexing mechanism, the impulse switch 76 is in a master circuit which includes interlocking circuits with the electrically energized components at the several stations so that the operations performed at the several stations will not take place until the impulse switch 76 is actuated by a member carried by the gear 64 at the moment the table stops at full indexed position with the pawl 65 engaging the stop 66 as shown in FIGURE 19 and the switches closed by buttons 108 and 108'.

The retraction stroke of the servo-motor 62 is controlled by a solenoid actuated means in the valve arrangement 68 by a circuit connected into the terminal or junction box 74.

After the operator has placed two bobbins B containing a residue of yarn upon the mandrels at the loading station 30, the interlocking switches 106 are actuated by manual depression of the switch knobs or buttons 108 and 108' completing a master circuit including solenoid control mechanism of the valve 68, actuating the valve to direct fluid, such as compressed air, to the front end of the servo-motor 72, retracting the holding shoe 70 thereby releasing the actuating pawl 65.

At the same time, fluid under pressure enters the forward end of the servo-motor 62 retracting the rack 63 rotating the quadrant gear or sector 64 counter-clockwise, the pawl 65 overriding the teeth of ratchet wheel 61. When the rack 63 is fully retracted, the switch 75 is closed by a cam on the rack, energizing a circuit actuating the solenoid mechanism of the valve 68 which directs fluid under pressure into the rear of the servo-motor 72 pivoting the holding shoe 70 to a position forcing the ratchet pawl 65 into mesh with a tooth of the ratchet wheel 61.

Concomitantly fluid under pressure enters at the rear of the servo-motor 62 advancing the rack 63 rotating the gear 64. The pawl 65, being held in engagement with the ratchet wheel 61 by the shoe 70, is moved with the gear 64 and moves the table 20 to an indexed position determined by engagement of the actuating pawl 65 with the abutment or stop 66. The impulse switch 76 is actuated by a member carried by the arm 64' secured to gear 64 and energizes a master circuit connected with the various components at the several operating stations to initiate the performance of operations at the several stations.

Figure 5:
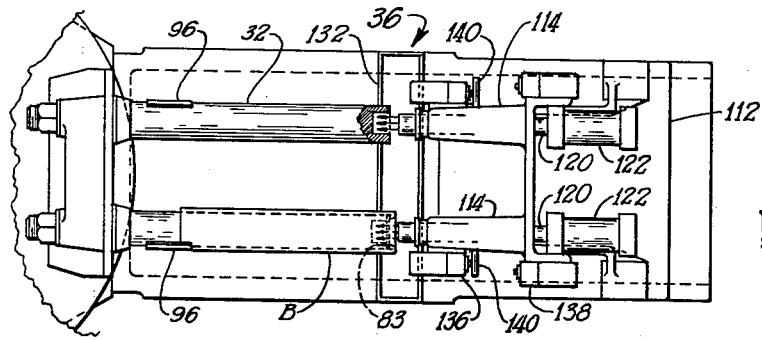
FIGURE 5 is a top plan view of a station at which the yarn or filamentary material identifying discs are removed from the bobbins.
Figure 6:
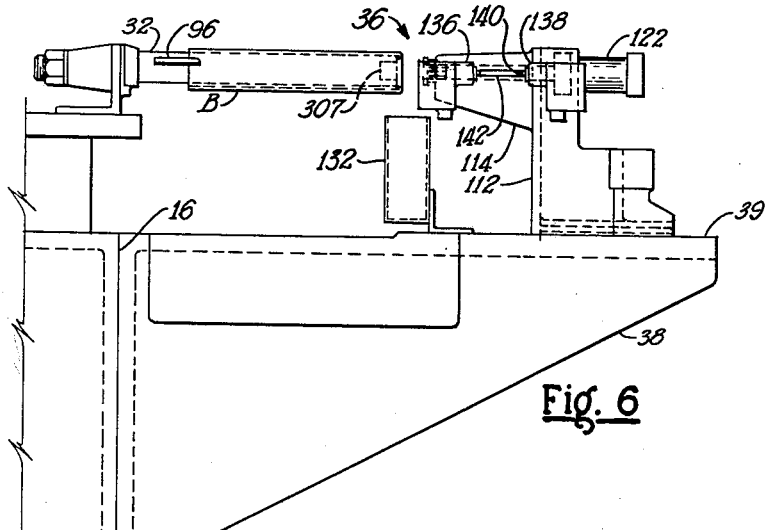
FIGURE 6 is an elevational view of the construction shown in FIGURE 5.

FIGURES 5 through 7 illustrate the components or mechanisms disposed at the second station identified as the de-discing station 36. The mechanism at this station functions to remove the yarn or material identifying disc 83 from the end of a bobbin and thus condition the bobbin to subsequently receive a new or fresh identifying disc. The method of removing the discs includes the steps of impinging a plurality of pointed barbs through the disc and withdrawing the disc by the barbs through the restricted passage defined by the bead 81 in the end of the bobbin B.

Mounted upon the planar portion 39 of the platform 38 is a standard or bracket 112 which is secured to the portion 39 of the platform by suitable means. The bracket 112 supports dual means for simultaneously removing discs from two bobbins, one of the disc removing means being shown in detail in FIGURE 7. The bracket 112 is provided with spaced boss portions 114, the axis of each being aligned with the axis of a mandrel when a pair of mandrels is in indexed position at station 36 as shown in FIGURE 5.

Each boss 114 is bored to receive a sleeve 116, shown in FIGURE 7, in which is reciprocably mounted a plunger 118, the plunger being connected to a piston rod 120 which is equipped with a piston (not shown) contained within fluid actuator cylinder 122, the actuator cylinders being supported by the bracket 112. The piston and cylinder arrangements are herein referred to as fluid actuated servo-motors or actuators and are preferably air actuated to reciprocate the plungers 118 slidably mounted within the sleeves 116.

Several sets or pairs of fluid actuated servo-motors of the same character are utilized for actuating various mechanisms for performing various operations in the apparatus of the invention. Each of the plungers 118 is threaded to receive a threaded tenon 121 which is secured to a head 123, the head being equipped with a plurality of pointed barbs 124, as shown in FIGURE 7. It has been found preferable to employ four barbs equally spaced circumferentially about the axis of the plunger 118.

The head 123 may be adjusted to provide a proper stroke by threading the tenon portion 121 relative to the plunger 118 and locked in adjusted position by a nut 126. The barbs 124 are adapted to be rapidly thrust through the disc 83, the ledges 128 of the barbs passing through the disc. Upon withdrawal of the barbs, the ledges engage the disc and withdraw the same from the opening defined by the circular bead at the end of the bobbin. The extremity of the sleeve 116 is formed with a flange 130 which forms a stripper means or plate which is engaged by the disc withdrawn by the barbs 124 and strips or removes the disc from the barbs.

A rectangularly shaped receptacle 132 is disposed beneath the stripper members or flanges 130 into which the removed discs fall by gravity as they are stripped from the barbs. The flow of fluid under pressure, such as compressed air, to the servo-motors 122 is controlled by valve means (not shown) actuated through relay mechanisms connected with microswitches 136 and 138. The plunger 118 of each de-discing unit is provided with a radially extending pin 140, shown in FIGURE 5, which is reciprocable in a slot 142 formed in the boss portion 114 and a registering slot in the stationary sleeve 116.

The pin 140 is adapted for alternate engagement with the switches 136 and 138 to control the valve mechanism for delivering fluid under pressure into the cylinder 122 alternately at opposite sides of the piston to reciprocate the barbs 124 and to ready the circuit for indexing the table after the completion of a de-discing operation. Thus, the table cannot be indexed until the pin 140 engages and closes the microswitch 138 after the completion of a de-discing operation and the barbs withdrawn into the sleeve 116 in the position shown in FIGURE 7.

The station indicated at 40 in FIGURE 1 includes a yarn severing apparatus of the same general character as that shown at station 50 which will be hereinafter described in detail. The stripper mechanism at station 40 may be employed as a means for stripping yarns from specially configurated bobbins, or as a stand-by mechanism for stripping yarns from standard bobbins in the event that the stripper mechanism at station 50 is out of operation. A portion of the apparatus at station 40 is shown in FIGURE 15 and is illusrated as adapted to strip residual yarns from flanged bobbins.

FIGURES 8 through 10 and 14 illustrate the mechanism at station 44 for inserting yarn identifying discs into the ends of the bobbins from which the old discs have been withdrawn at the de-discing station 36. FIGURE 8 illustrates dual units employed for supplying fresh discs for bobbins carried by the respective mandrels, the disc applying units being of identical construction.

Mounted upon the table portion or extension 46 is a bracket 146 to which is secured a pair of elongated members 148, the members 148 being fashioned to provide magazines for holding stacks 150 of discs 83 which are to be applied to the ends of bobbins as the pairs of bobbins are successively indexed or moved to the disc applying station 44. Each of the members 148 is formed with a boss portion which is bored to slidably accommodate a plunger 152, the axis of which is aligned with a bobbin carrying mandrel and is reciprocable for applying a disc to the end of a bobbin.

Each of the plungers 152 is provided with a disc applying head 154, each plunger being reciprocated by a servo-motor unit 156 of the cylinder and piston type, each cylinder being supported by an elongated member 148. Each of the servo-motor units 156 is actuated by fluid pressure, such as compressed air, controlled by solenoid actuated valve mechanism controlled by switches contained in housings 160 and 162 supported by the member, there being a valve means for each of the servo-motor units.

Associated with the respective housings are microswitches 164 and 166. Secured to each of the plungers 152 is a laterally extending member or pin 168 accommodated in a slot 170 in the member 148 which is reciprocable with the plunger 152 for alternate engagement with the microswitches 164 and 166 for energizing the solenoid means in the valve housings 160 and 162 to alternately actuate the valves to control flow of compressed air into opposite ends of the servo-motor cylinders to reciprocate the plungers 152.

Each member 148 is provided with a generally cylindrically shaped portion 178 having a hollow interior 180 of a diameter to receive a stack of discs 150. Means is associated with each unit for urging or biasing the stack of discs in a forward direction to feed the discs into a position to be applied to the bobbins. In the embodiment illustrated, each of the elongated members 148 is provided with brackets 183 supporting rods or ways 181 upon which is slidably supported a block or runner 182, shown in detail in FIGURE 10, which supports a pad or member 184.

The pad 184 is provided with a slot 185 and a headed bolt 186 carried by the block 182 cooperates with slot 185 to permit lateral withdrawal of the pad or member 184 from disc engaging position when it becomes necessary to replenish the supply of stacked discs in the interior 180 of the magazine 178. The wall of each magazine is provided with a lengthwise slot 188 to accommodate movement of the pad 184 along the rods 181. Secured to each of the blocks or runners 182 is a flexible cable 190 which passes partially around a pulley 192 and depends in a vertically arranged tubular guide 194, the guide being secured to the table 46.

Secured to the lower end of each cable 190 is a weight 198 shown in FIGURE 9. Through the medium of the weight 198 and cable 190 connected with the runner 182, a constant force is applied to the outer end of the stack of discs to bias or urge them toward disc applying position.

A disc transfer means, shown in FIGURES 8, 9, 10 and 14, is associated with each member 148 for successively transferring individual discs from the end of the stack of discs to a position in alignment with the head 154 of a plunger 152 to position each disc for application or insertion into the end of a bobbin. Secured to the bracket 146 is a substantially rectangular bracket 202 which is of U-shaped cross-section as shown in FIGURE 9. Disposed within the U-shape of member 202 is a member 204 within which is mounted a slidable element or slide 206 connected with a piston rod 205 of a fluid pressure operated servo-motor unit 207, the member 204 being provided with an opening 209, shown in FIGURE 14, which accommodates passage of an individual disc transferred from the end of the stack of discs by the slidable element 206 for application to a bobbin by the disc applying plunger 152.

Secured to each piston rod 205 is a bracket 210 which is connected to the rear of the slide 206 for reciprocating the slide through a distance required to transfer a disc from the stack of discs 150 to a position in line with the opening 209 and the end of a bobbin. Mounted on the bracket 210 is a pin or member 212. Supported upon a member 214 carried by the bracket 146 are switch housings 216 and 217 which house microswitches arranged to actuate valve mechanism for controlling the flow of compressed air into the respective ends of the cylinder 207 for reciprocating the slide 206, the microswitches being alternately actuated by the pin 212. Through this arrangement, a disc is selectively removed from the stack of discs 150 by the recessed end of the slide 206 and is moved by the slide 206 to a position in line with the head 154 on the disc applying plunger 152 which is also aligned with the opening 209 in member 204.

The switch means in the housing is interconnected with circuit means controlling the delivery of compressed air into the servo-motor 156 to advance the plunger 152 for engaging the head 154 with the individual disc occupying the opening 209 in the member 204 for moving the disc out of the opening and into the end of a bobbin B carried by the adjacent mandrel, as shown in FIGURE 8. The servo-motor 156 is controlled in a manner that the ram 152 is advanced to apply a disc to a bobbin and is retracted before the adjacent servo-motor 207 returns the slide 206 to a position bringing the recess 208 into registration with the stack of discs 150 to receive the end disc of the stack preparatory to a succeeding transfer thereof to another bobbin.

FIGURES 11 through 13 illustrate the apparatus of the two yarn removing or stripping stations. This station is designated 50 in FIGURE 1 and is substantially identical with the arrangement shown at the stand-by yarn stripping apparatus at station 40. The apparatus at the bobbin stripper or yarn removing station 50 includes two identical units for simultaneously severing or cutting yarn from pairs of bobbins as they are indexed to the stripping station from the disc applying station 44.

Mounted upon the uniplanar table portion 53 are lengthwise spaced brackets 222 and 224, shown in FIGURE 12. The bracket 222 is fashioned with spaced boss portions 226 and the bracket 224 is formed with spaced boss portions 230. The pairs of boss portions are bored to accommodate shafts or rods 232 and 234 which form parallel ways slidably supporting the yarn severing or yarn stripping units. The rods or shafts 232 and 234 are secured in position by means of nuts 236.

A supplemental frame or carriage 238 is disposed above the shafts 232 and 234 and is formed with boss portions 240 which are bored to snugly yet slidably accommodate the rods 232 and 234, the carriage 238 being slidable lengthwise of the rods. The supplemental frame or carriage 238 is formed with upwardly extending pairs of bosses, the bosses of each pair being designated 244 and 246. Each pair of bosses is provided with bores to accommodate a shaft 250 and each shaft provides a pivotal support for a yarn severing or stripping device or instrumentality.

Each yarn severing device includes a member 252 which is journally supported by the shaft 250 and is formed with an extending arm 256 provided with a boss portion 257 which supports a housing 258 enclosing a motor, as for example, a fluid pressure operated or air motor. The motor is provided with a shaft 260 upon which is mounted a yarn severing means 262 in the form of a thin disc-like cutter or wheel of a hard material suitable for severing yarn and, especially, yarn formed of glass fibers or filaments.

Each of the yarn severing instrumentalities is pivoted for movement about the axis of a shaft 250 to enable the movement of the yarn severing instrumentality from an out-of-use position into a position engaging yarn on a bobbin for severing the convolutions of yarn from the bobbin. Means is provided for moving the arms 256 and the motors carried thereby from an out-of-use position to a position bringing the cutters or yarn severing means or instrumentalities into positions to engage yarn on the bobbin.

Mounted upon the carriage 238 is a servo-motor 266 of the cylinder and piston type, the piston rod 268 of which is pivotally connected by means of a pin 270 with an arm 272 secured to the arm 256. Fluid pressure entering the upper end of the cylinder of the servo-motor 266 forces the piston downwardly elevating the arm 256 and the air motor to its uppermost or out-of-use position.

Fluid introduced at the lower end of the servo-motor cylinder moves the rod 268 upwardly and brings the arm 256 and air motor housing 258 into yarn severing position.

Each of the yarn severing cutter units is guided or controlled during operations of severing yarn from bobbins by a cam means. As particularly shown in FIGURES 11, 12 and 13, each air motor housing 258 is provided with a laterally extending arm or bracket 274. Each of the brackets 274 is formed with an elongated slot 276 in which is adjustably supported a pin or member 278.

Each member 278 is provided with a threaded portion accommodating a securing nut for securely fastening member 278 in adjusted position. The member 278 rotatably supports a roller or cam follower 282 which is adapted to cooperate with a cam surface 284 of a cam plate 286, there being two cam plates 286 shown in FIGURE 11, one for each of the yarn severing units.

Means is provided at the yarn stripping station engageable with the mandrels to provide rigid supports for the distal ends of the mandrels 32 and to assure proper relationship between the bobbins and yarn severing units.

Mounted on the stationary bracket 224 is a pair of fluid pressure actuators 305 of the cylinder and piston type, the piston rods of the actuators extending through bores provided in elongated portions 306 formed on the bracket 224 and connected with plungers 308. The reciprocation of the mandrel engaging plungers 308 is controlled by microswitches 309 and 310, shown in FIGURE 12. The side wall of each of the elongated portions 306 is formed with a slot 311 to accommodate reciprocatory movement of a pin 312 carried by each of the plungers 308. The pin 312 on each plunger is movable therewith and adapted for alternate engagement with the microswitches 309 and 310 to alternately energize solenoid actuated valve means for controlling flow of fluid under pressure alternately into the opposite ends of the cylinders of the actuators 305. When the table is indexed to move a pair of succeeding mandrels into position at the yarn stripping station, the master control circuit actuates solenoid operated valve mechanism to introduce fluid under pressure into the rear ends of the actuators 305 to move the plungers 308 into the bores 307 formed in the ends of the mandrels to provide rigid support for the mandrels during a stripping operation. When switches 310 are closed, all stations operate simultaneously, the pins or plungers 308 checking indexing of the table 20 before any station initiates its cycle. The plungers are actuated just prior to the movement of the arms 256 and strand cutting discs or wheels 262 into operative or strand severing position.

In the yarn stripping or severing operation, a severing wheel 262, while rotating, traverses the full length of one of the shallow grooves 84 in a bobbin B so as to assure the severing of all of the convolutions of yarn or filamentary material contained on the bobbins.

In the embodiment illustrated in FIGURES 11 through 13, the roller or follower supporting pin 278 is adjustable so that the proper correlation may be established between the follower 282 and the adjacent cam surface 284 whereby the follower and cam arrangement functions to properly guide the traverse or path of the severing wheel 262 in the groove 84 of a bobbin.

In this manner the yarn on the bobbin is stripped or severed without any contact of the severing wheel with any portion of the bobbin. Through this arrangement, the yarn is stripped from a bobbin without scoring or impairing the bobbin or tube in any manner. The severing unit supporting carriage 238 is reciprocated by the piston 298 under the influence of fluid under pressure introduced into an actuator or cylinder 300, the piston being connected to the carriage as at 302.

The carriage is equipped with a bracket or member 304, which is adapted at the ends of each longitudinal stroke or reciprocation of the carriage 238 to alternately engage limit switches 320 and 322 which control the reversing movement of the carriage 238.

Thus, when the severing units complete a severing operation through their simultaneous movement in a left-hand direction as viewed in FIGURE 12, the member 304 engages the limit switch 322, the latter operating a solenoid valve mechanism which functions to direct pressure fluid into the left-hand end of the cylinder of the actuator 300 causing movement in a right-hand direction of the carriage 238 and the severing units to retract them to their initial positions in condition for a subsequent severing operation.

Upon retraction of the carriage 238, the member 304 engages the limit switch 320 to operate valve mechanism for interrupting flow of pressure fluid into the left-hand end of the cylinder 300 and setting or conditioning the valve mechanism for the subsequent introduction of fluid under pressure into the right-hand end of the cylinder of the actuator 300 for carrying on a succeeding yarn severing or stripping operation.

At the completion of the retraction stroke of the yarn severing units, the limit switch 320 is actuated which controls valve mechanism directing fluid under pressure into the upper ends of the cylinders of the actuators or servo-motors 266. The fluid pressure in the upper ends of the cylinders forces the pistons in the cylinders connected with the rods 268 downwardly to elevate the yarn severing units about the axes of the shafts 259 away from the regions of the bobbins from which the yarn has been removed or stripped preparatory to an indexing movement of the table 20 to move a succeeding pair of bobbins into position at the yarn severing station 50.

Means is provided for effectively conveying away the severed yarn or filamentary material removed from the bobbins. As shown in FIGURES 11 and 13, tubes 330 are disposed beneath the severing wheels 262, the tubes merging into a larger tube 332 which terminates at a region remote from the stripping station. The tubes 330 are mounted upon and movable with the carriage 238, the entrances of the tubes being arranged adjacent the respective cutting wheels 262. The tube 332 is of the flexible conduit type so as to facilitate movement of the tubes 330 with the yarn severing units.

The flexible tube 332 is connected with a suitable suction blower (not shown) to establish air movement into each of the tubes 330 from the region adjacent the bobbins. During the severing of yarn or filamentary material from the bobbins, the reduced pressure or suction existent in the tubes 330 directs or diverts the severed or stripped waste yarn into the tubes for conveyance away from the yarn severing station and deposited in a suitable receptacle (not shown). Through this arrangement, the severed or waste yarn is immediately disposed of so that the surround environment is not contaminated thereby.

FIGURES 16 and 17 illustrate the station 56 at which the stripped or conditioned bobbins are discharged from the supporting mandrels for subsequent winding or packaging of filamentary materials thereon. The structural arrangement at the bobbin removing station is inclusive of means for slidably moving the bobbins lengthwise from the mandrels until the bobbins are free of the mandrels and deflecting the bobbins into a receiving receptacle 338 shown in FIGURE 1.

Supported upon the platen or table portion 340 of the member 58 are brackets 342 and 344. The bracket 342 is arranged adjacent the indexing table 20 and is formed with boss portions 346 which are bored to receive and support the end regions of parallel rods or ways 350. The opposite ends of the ways 350 are supported in the brackets 344, the rods being held in place by nuts 352 on threaded tenons at the ends of the rods.

The rods or ways 350 support a means for engaging and slidably removing the bobbins B from the mandrels. This means is inclusive of a carriage 356 provided with elongated boss portions 358 which are bored to accommodate the rods 350 for slidable movement along the rods. Secured to the carriage 356 is an L-shaped member 360, the upwardly extending portion 362 thereof terminating adjacent the mandrels 32 with only sufficient clearance for the mandrels to be moved into and out of bobbin removing position.

Mounted upon an elongated support 364 is a pressure fluid actuator 366, the cylinder 368 of which is disposed lengthwise in parallelism with the rods 350. The piston 369 within the cylinder is connected with a piston rod 370, the distal end of which is connected with the carriage 356. The introduction of compressed air alternately into the ends of the cylinder 368 effects slidable reciprocatory movements of the carriage 356 and the bobbin engaging portion 362 of member 360 for removing the bobbins.

Microswitches 374 and 376 are disposed in spaced relation and in the path of an abutment 378 adjustably supported by the carriage 356. The microswitch 374 is actuated by the abutment 378 upon the return stroke of the carriage 356 to condition the solenoid actuated valve mechanism in housing 379 controlling the flow of fluid under pressure to the left-hand end of the cylinder 368 as viewed in FIGURES 16 and 17 to initiate a bobbin-removing stroke of the portion 362 and carriage 356 when the mandrels carrying the stripped bobbins are indexed into bobbin-removing position.

When the carriage 356 completes a bobbin removing stroke to disengage the bobbins from the mandrels, a second abutment 380 on the carriage engages the switch 376 to actuate solenoid controlled valve mechanism in a housing 381 for admitting fluid into the right-hand end of the cylinder 368 to effect a return stroke of the carriage 356 to the position illustrated in FIGURES 16 and 17.

Mounted upon the support 58 is a bobbin deflector 384 comprising an end plate or baffle 385, side portions 386 and ramps 387. The side portions 386 are secured to the support 58 by means of bolts 383. The apex or ridge 392 forming the juncture of ramps 387 is disposed midway between the bobbins when the same are stripped from the mandrels.

Thus, when the bobbins are free of the mandrels, they drop upon the ramps 387 and move by gravity from the ramps into a receptacle 338 disposed beneath the deflector 384 as shown in FIGURE 1. The end plate or wall 385 prevents the bobbins which are rapidly removed from the mandrels from being projected beyond the deflector 384.

A cycle of all operations performed by the apparatus at the several indexed positions is as follows:

At the completion of a preceding cycle of operations, the pair of mandrels 32 at the bobbin discharging station have been moved by the table indexing mechanism shown in FIGURE 19 into indexed position at the loading station identified at 30 in FIGURE 1. At this station the operator telescopes, onto each of the mandrels, a bobbin bearing a residue of yarn or filamentary material which is to be removed by the utilization of the method and apparatus of the invention.

It is to be understood that the several operations are simultaneously performed upon pairs of bobbins at the stations 30, 36, 44, 50 and 56 during each indexed position of the table 20 and, in the event that the severing units at station 50 are out of operation or if bobbins of special configuration or design are being processed, then operations are carried on at the stand-by yarn stripping station 40. As there are six indexed positions of the table 20 for each complete revolution, the table and pairs of mandrels carried thereby are moved through one-sixth of a revolution at each table indexing operation.

The operator slides or telescopes the bobbins onto the mandrels 32 at loading station 30 until the ends of the bobbins adjacent the table 20 abut the keys 96 shown in FIGURES 2 and 3. The operator rotates each bobbin until the notch or open ended slot 85 in the end of the bobbin registers with the adjacent key 96, the operator exerting pressure toward the mandrel as the bobbin is manually rotated until the key engages in the slot.

When the slots and keys are aligned, the operator moves the bobbins further inwardly to engage the keys in the slots, bringing the ends of the bobbins into engagement with the plungers 97 of microswitches 98 which condition a circuit to the terminal or junction box 74 of the indexing mechanism shown in FIGURE 19. Assuming that the operations at the other stations have been performed and completed on the pairs of bobbins at the several stations, the apparatus is conditioned in preparation for a succeeding series or cycle of operations.

After properly loading a pair of bobbins B on the mandrels at the loading station 30, the operator manually depresses the buttons or knobs 108 shown in FIGURES 1 through 4 closing interlocking switch mechanisms contained in the housings 106 at the loading stations to complete a circuit to the indexing mechanism to initiate the operation of the indexing mechanism shown in FIGURE 19. At the start of an indexing operation, the piston carrying the rack 63 is at the right-hand end of the cylinder of the actuator 62 as shown in FIGURE 19 and the pawl 65 is in a position to engage one of the teeth in the ratchet wheel 61.

The arm 64' carrying the pawl 65 is in a position one-sixth of a revolution away from the abutment 66, the pawl holding shoe 70 being in its outermost or pawl releasing position, having been moved to such position by fluid pressure introduced into one end of the fluid actuators 72. The actuation of the switches 106 energizes the circuit to the solenoid mechanism of the valve means 68 shown in FIGURE 19, initiating flow of compressed air or other fluid under pressure into the right-hand end of the cylinder of the actuator 62 causing the rack 63 to be moved longitudinally in a left-hand direction as viewed in FIGURE 19.

The engagement of the rack teeth with the teeth of the gear 64 effects rotation of the gear 64, the ratchet wheel 61, and the table 20 and the pairs of mandrels carried thereby, in a clockwise direction as viewed in FIGURE 19.

Simultaneously with the admission of compressed air into the right-hand end of the cylinder of actuator 62, compressed air is introduced into the upper end of the cylinder of actuator 72 to extend the piston rod of the actuator, swinging the pawl shoe 70 about its pivot 71 into engagement with the pawl 65 to hold the pawl in engagement with a tooth of the ratchet wheel 61 during rotation of the ratchet wheel by the rack 63.

Rotation of the ratchet wheel continues in a clockwise direction until the pawl 65 engages the abutment or stop 66, this engagement determining the indexed position of the table. The arm 64' in indexed position with the pawl 65 engaging the abutment carries a dog (not shown) which operates a switch contained in housing 76 energizing a circuit through the solenoid operated valve mechanism 68 to cause flow of compressed air into the opposite end of the cylinder of the actuator 62 to cause a retraction of the rack 63 to its initial position. The pawl 67, which overrides the teeth of the ratchet wheel 61 during an indexing movement, engages teeth of the ratchet wheel 61 to prevent any counter-clockwise or retractive movement of the table 20.

During a retraction movement of the rack 63 in preparation for a subsequent indexing operation, a cam (not shown) carried by the rack 63 actuates a switch 75 which reverses solenoid valve mechanism in the operated valve arrangement 68 to condition the mechanism for subsequent introduction of compressed air into the cylinder of the actuator 72 to move the holding shoe 70 out of holding engagement with the pawl 65.

The switch mechanism 76 effects the operation of valve means actuating the mandrel positioning pins 308 which close switches 310 activating the mechanisms at other operating stations for initiating the operation of such mechanisms which are carried on substantially simultaneously.

The first indexing movement of the table 20, after the bobbins have been placed on the mandrels 32 at the loading station, brings the pair of bobbins into indexed position at the de-discing station 36. At the completion of the indexing of the mandrels and bobbins at this station, compressed air is introduced into the right-hand ends of the actuator cylinders 122 under the influence of solenoid valve mechanism triggered through a master circuit of the switch 76.

The pistons in the actuators 122 move rapidly in a left-hand direction as viewed in FIGURES 5 and 7 thrusting the pointed barbs 124 through the yarn identifying discs 83 in the ends of the bobbins. At the completion of the stroke of the barbs 124 through the discs, the pins 140 carried by the plungers 118 engage microswitches 136, energizing valve mechanisms to effect introduction of compressed air into the left-hand ends of the cylinders of actuators 122, retracting the plungers 118 and the barbs 124.

Upon the retraction stroke, the ledges 128 of the barbs engage the reverse side of each disc 83 and withdraw the disc through the restricted opening in the end of a bobbin. As the barbs move into the interior of the sleeves 116, the discs 83 engage the flanges or stripper means 130 and are stripped or removed from the barbs.

Upon retraction of the barb assemblies, the pins 140 engage the limit switches 133 actuating solenoid operated valve mechanism interrupting the flow of compressed air to the cylinders of the actuators 122, thus conditioning the arrangement for a subsequent de-discing operation. The limit switches 138 are intercalated in the programming circuitry so that no further reciprocation of the barb-carrying plungers takes place until a subsequent indexing operation has occurred.

In the normal cycle of operations, the stripping of the residue of yarn on the bobbins takes place at station 50 and, hence, the stand-by stripping devices at station 40 perform no operation unless the stripping units at the station 50 are out of operation or the stripping units at the station 40 are utilized for stripping yarn from specially shaped bobbins. Thus, while other operations are occurring at the several stations, no action is performed at station 40 except under the conditions abovementioned. It is to be understood that stripping operations may be normally carried on at the stripping station 40 and station 50 providing a stand-by unit.

At the completion of the succeeding indexing operation, the bobbins previously at the de-discing station are indexed into proper position at the disc applying station 44, the mechanism at this station being shown in FIGURES 8 through 10 and 14. As the bobbins move into proper position at the disc applying station 44, relay means in the master circuit energizes solenoid controlled valve mechanism in the housings 219 shown in FIGURES 8 and 14 to effect the flow of compressed air into the outer ends of the cylinders of actuators 207 causing movement of the slides or disc transfer members 206 toward each other.

The endmost discs of the stacks of discs 150, shown in FIGURES 8 and 9, are disposed in the recesses 208 in the slides 206 so that each disc is transferred by the adjacent slide from the end of the stack to a position in alignment with a plunger 152. When each slide 206 has completed its stroke to move a disc into registration with a bobbin B, the pin 212 on each slide engages a microswitch 217 which energizes solenoid controlled valve mechanism in each of the housings 219 to direct compressed air into the opposite ends of the cylinders of actuators 156 (see FIGURE 8) to cause movement of the plungers 152 in a left-hand direction as viewed in FIGURE 8.

The heads 154 on the plungers 152 engage the discs in the openings 209 forcing the discs through the restricted openings formed by the inwardly extending beads or ridges 81 on the bobbins to seat the discs in the ends of the bobbins. At the completion of the disc-inserting strokes of each of the plungers 152, the pins 168 carried by the plungers 152 engage microswitches 164 energizing solenoid controlled valve mechanism to retract the pistons of cylinders 156 and 207 and close the interlock switches 162 and 216 preparatory to the next indexing operation. This action retracts the disc applying plungers 152 and moves the slides 206 to again reestablish alignment of the disc receiving recesses 208 with the stacks of discs 150.

The stacks of discs are normally biased in a lefthand direction as viewed in FIGURES 8 and 9 under the influence of the cable supported weights 198 to successively bring the endmost discs into the recesses 208 formed on the disc transferring members 206. Upon retraction of slides 206 to their initial positions, the pins 212 engage microswitches 217 to reset solenoid actuated valve means in preparation for again directing compressed air into the actuators 207 when the master circuit is again triggered by the impulse switch 76 to initiate the next table indexing operation.

When a stack 150 of yarn identifying discs is exhausted from a magazine provided by the elongated portion 178 shown in FIGURES 8 and 9, the operator slides the pad or member 184 transversely away from the magazine 178 to admit the insertion of another stack of discs. After the insertion of a stack of discs, the operator moves the adjacent runner or block 182 lengthwise of the stack in a right-hand direction as viewed in FIGURE 9 which action, through the cable 190, elevates the weight 198 in the adjacent guide tube 194.

When the runner 182 is beyond the right-hand end of the stack of discs, the member 184 is moved transversely of the block 182 to project the pad 184 in registration with the outermost end of the stack of discs.

Under the influence of the weight 198, the block 182 and member 184 are moved in a left-hand direction engaging the member 184 with the end of the stack of discs and thereafter the force of gravity, acting on the weight 198, moves the stack of discs in a left-hand direction as successive discs are removed from the stack by the transfer slides 206 for insertion in the bobbins.

At the next indexing movement of the table 20, the bobbins, equipped with fresh yarn identifying discs, are moved into position at the yarn removing or stripping station 50, shown in FIGURES 1 and 11 through 13. Upon completion of the indexing step, the impulse switch 76, connected in the master programming circuit, energizes solenoid operated valve mechanism (not shown) to direct compressed air into the right-hand ends of the cylinders of actuators 305 at station 40.

The pistons in the cylinders are thereby moved to project the plungers 308 into sockets or bores in the ends of the mandrels 32 at station 40 to key the table 20 in proper position. Limit switches 306 are actuated at the completion of the forward movement of the plungers 308 energize circuits arranged to actuate solenoid controlled valve mechanism controlling the flow of compressed air into the cylinders of the actuators 266.

Upon completion of the forward movement of the plungers 308 into the mandrels, compressed air is introduced into the lower ends of the cylinders of actuators 266 exerting upward movement on the piston rods 268 swinging the arms 256 about the shafts 250 in a counterclockwise direction as viewed in FIGURE 12. The arms 256 continue such movement until the rollers or cam followers 282 engage the cam surfaces 284 of the cam plates 286. At this stage the microswitches H are engaged by projections on the arm 256 complete a solenoid circuit of valve means to direct fluid under pressure into the rear end of the cylinder of the actuator 300.

An interlock switch H is provided for each severing unit and these switches are interconnected so that compressed air does not enter the actuator 300 until both arms 256 are in an operative position with the rollers or followers 282 engaging the adjacent cams. Compressed air entering the rear of the cylinder of actuator 300 moves the piston 298 forwardly together with the carriage 238 which is slidable along the ways or rods 232 and 234 parallel with the bobbins. The cam contours 284 are adapted to control the paths of movement of the followers 282 and the paths of traverse of the rotating yarn severing wheels or cutters 262.

The air motors within the housings 258 are continuously actuated by compressed air so that the yarn severing cutters 262 are rotated continuously during operation of the apparatus. The fluid pressure is maintained beneath the pistons in the actuators 266 so that continuous pressure is exerted to cause the cam followers 282 to contact the cam surfaces 284 throughout the entire longitudinal movement of the carriage 238.

The introduction of compressed air into the end of the cylinder of actuator 300 moves the carriage in a left-hand direction as viewed in FIGURES 11 and 12. During this movement, the cam followers engaging the cam surfaces of cam plates 286 guide the rotating cutters 262 into engagement with the residue yarn on the bobbins. The followers 282 are adjusted so that the peripheries of the cutter or yarn severing discs traverse the longitudinal grooves 84 on the bobbins. As the cutters 262 are rotating at high speed, the convolutions of yarn or filamentary material on the bobbin are severed so that when the cutters 282 have traversed the full lengths of the bobbin, all of the yarn on the bobbins is stripped or cut from the bobbins.

The tubes 330 attached to the carriage 238 move with the carriage and are disposed with their entrances beneath and adjacent the yarn cutting wheels so that as the yarn on the bobbins is progressively severed by movement of the cutters lengthwise of the bobbins, the pieces or short lengths of severed or waste yarn are directed into the tubes 330 under the influence of a suction blower connected with the tubes by a flexible tube 332 the flexible tube accommodating lengthwise movement of the carriage.

When the cutting strokes of the yarn severing wheels are completed, the member 304 on the carriage engages the microswitch 322 energizing a circuit through a solenoid operated valve means to introduce compressed air into the opposite or left-hand end of the cylinder of actuator 300 as viewed in FIGURE 11 to cause retractive movement of the piston rods 298 and the carriage 238 returning the carriage and severing units to their initial position shown in FIGURES 11 and 12.

When the carriage approaches its initial position, the member 304 engages the microswitch 320 which energizes solenoid valve means for directing compressed air into the upper ends of the cylinders of the actuators 266. The fluid pressure moves the piston and rods 268 downwardly to swing the arms 256 in a clockwise direction about their pivot shafts thus elevating the air motors 258 and the yarn severing wheels to their uppermost or out-of-use positions. As the arms 256 reach their maximum positions in a counter-clockwise direction, a projection on one of the arms 256 actuates the interlock switch H which is interconnected in the master programming circuit to trigger the master circuit in preparation for an indexing movement of the table.

The severing or stripping of the convolutions of residue yarn from the bobbins is effected without any contact between the yarn severing instrumentalities and the bobbins, so that there is no scoring or mutilation of the bobbins. The yarn is severed from a pair of bobbins in a few seconds of time.

The succeeding indexing movement of the table 20 disposes the mandrels carrying the previously stripped bobbins at the discharge station 56. The completion of the yarn stripping operation completely reconditions the bobbins in that the old yarn identifying discs in the bobbins have been removed, fresh yarn identifying discs have been inserted in an end of each bobbin and all residue yarn stripped from the bobbins at the stripping station.

When the indexing step is complete the master circuit through the impulse switch 76 actuates a solenoid controlled valve means which directs compressed air into the left-hand end of the cylinder of actuator 368 as viewed in FIGURE 16 to move the piston 369, rod 370 and the slide or carriage 356 in a right-hand direction, the carriage being slidable on the ways 350 parallel with the pair of mandrels. The portion 362 of member 360 mounted on the carriage 356 extends close to the mandrels 32 and in a position to engage the ends of the bobbins whereby the reconditioned bobbins are stripped lengthwise from the mandrels The bobbins fall by gravity one upon each of the ramps 387 and roll from the ramps into the bobbin receiving container 338 beneath the bobbin deflector 384. The abutment 380 on the carriage 356 engages microswitch 376 at the outermost limit of movement of the carriage or slide energizing solenoid valve mechanism in the housing 381 introducing compressed air into the outermost end of the cylinder of the actuator 368 to move the carriage 356 to its innermost or normal position closing the interlock switch 374 and in a position to remove the next set of bobbins.

FIGURE 15 is illustrative of a yarn stripping unit at the stripping stations 40 wherein the unit is adjusted and the cam configurated to sever or strip convolutions of yarn from a flanged bobbin B′ of the character shown in FIGURE 22 or a double flanged spool B″ shown in FIGURE 15.

When a pair of severing units is employed for removing yarn from pairs of flanged spools or bobbins, cam plates 388 are employed having cam surfaces cooperating with cam followers 282 carried by arms 274 so as to provide for the added depth of transverse of the yarn severing wheels or discs 262 adjacent the flanges in order to sever the yarn at the juncture of each flange with the cylindrical surface of the bobbin.

Each cam plate 388 is provided with a cam surface 389 which guides the adjacent cam follower and the severing disc 262 in a lengthwise groove in the bobbin throughout the major portion of its length. The cam surface 389 joins with recessed cam surfaces 390 and 391 adjacent the flanges of a double flanged bobbin so as to guide the yarn severing disc 262 into the slots 90 and 90′ provided adjacent the flange or flanges of a bobbin. The operation of the units at both stations 40 and 50 are otherwise substantially the same except that the stripping unit at staion 40 is equipped with the mandrel engaging pins or plungers 308. It is to be understood that cam plates of other shapes may be employed for guiding a severing means or disc for removing yarn from bobbins of other types.

FIGURES 24 through 26 illustrate a modified form of bobbin supporting mandrel construction associated with means for automatically gripping and releasing the bobbins. The components of this construction are adapted to be cam controlled whereby the bobbins are automatically gripped or held by releasable means on the mandrels from the time the pairs of mandrels are indexed away from the loading station until they are released as they approach the bobbin unloading station.

Referring to FIGURES 24 through 26, the mandrels 400, in pairs, are arranged in the same relative positions as mandrels 32 in the other form of the invention. The mandrels of each pair are provided with tenons 401 extending through suitable bores formed in brackets 402 mounted upon the table 20′. Each mandrel is held in place by a nut 403. Each of the mandrels 400 is of tubular configuration, one end being provided with a guide bushing 404 pressed into the outer end of the mandrel, a second guide bushing 405 being threadedly secured in the opposite end of the mandrel.

A control rod or shaft 406 extends through the hollow mandrel and through openings formed in the guide bushings 404 and 405, the rod 406 being longitudinally movable relative to the mandrel to control the bobbin gripping means or clutch. A wall region of the mandrel is provided with a plurality of longitudinal slots 408 which accommodate radially movable clutch members or bobbin engaging means 410, there being two members 410 spaced peripherally of the mandrel.

The outer end regions of the bobbin engaging members 410 are provided with recesses to accommodate comparatively thin metal bands or rings 412 which loosely surround the mandrel and provide a resilient means for preventing dislodgment of the members 410 but permitting sufficient movement of members 410 radially to engage the inner cylindrical surface of a bobbin. The rod 406 is provided with cone-shaped cams or clutch actuating members 416 which are secured to the rod by means of pins 417. Each of the clutch members or bobbin engaging members 410 is provided with tapered or canted surfaces 418 which are adapted to be engaged by the cone-shaped members or cams 416.

The rod 406 is normally biased in a left-hand direction as viewed in FIGURE 25 under the influence of an expansive coil spring 420 disposed between the guide bushing 404 and the adjacent cone-shaped member 416. Movement of the rod 406 under the influence of the spring 420 engages the tapered or cone-shaped members 416 with the tapered surfaces 418 of clutch members 410 thus resiliently biasing or urging the clutch members outwardly causing them to frictionally engage the inner wall of the bobbin telescoped onto the mandrel.

A guide member or bushing 422 is disposed within the mandrel and adjacent one of the cone-shaped members 416 providing added support for the rod. Means is provided for automatically moving the rod 406 lengthwise of the mandrel to actuate and release the bobbin engaging members 410. A bar or bridge members 426 is provided with a bushing at each end to accommodate a spherically shaped means on each rod as shown in FIGURE 24.

Each rod 406 is provided with a tenon 427 accommodating a nut 428. Secured to the bar 426 are parallel plates 430 of generally triangular shape, the apex regions of the plates being bored to accommodate a pivot shaft 432. The end regions of the shaft 432 are provided with threaded tenons 433 accommodating nuts 434 securing the pivot shaft 432 to the plates 430. A roller or cam follower 436 is journalled for rotation upon the shaft or pin 432. Spring means surrounding each rod biases the roller 436 toward a cam 450.

Extending downwardly through the center of the table 20' on the axis of rotation thereof, is a vertical shaft 440 which is stationary and is secured to a frame portion of the apparatus by means (not shown). Surrounding the shaft 440 is a bushing 442 provided at its upper end with a collar 444 upon which is mounted a circular member 446. The upper end of shaft 440 is threaded to receive a nut 448 securing the member 446 to the shaft 440.

The member 446 is provided with a flange 449 to which is secured a cam 450 by bolts 452. The cam surface 454 of cam 450 is generated as an arc about the axis of rotation of the table 20', the ends of the cam being provided with curved entrant portions 456 to facilitate engagement and disengagement of the roller 436 with the cam. The cam surface 454 extends throughout a peripheral distance of about ninety degrees and embraces the unloading position and the loading station of the mandrels as indicated in FIGURE 24.

When a pair of mandrels is at the loading station as shown in FIGURE 24, the rods 406 are at their maximum right-hand position by reason of engagement of the roller 436 with the cam surface.

The mandrels 400 are each provided with slots 421 and 423 adjacent the end positions of bobbins and are for the purpose of accommodating or providing clearance spaces for the yarn severing discs or wheels when the latter are utilized with flanged bobbins where the discs move through slots adjacent the flanges in order to remove all of the yarn from the flanged bobbins.

The operation of the arrangement shown in FIGURES 24 through 26 is as follows: With a pair of mandrels 400 at the loading station, the cam surface 454 engaging the cam follower or roller 436 holes the rods 406 in their extreme right-hand positions as viewed in FIGURES 24 and 25 with the springs 420 on the rods being in compressed condition. In this position of the rods 406, the cone-shaped members 416 are in a right-hand position and the bobbin engaging bars or members 410 are in their innermost radial or released positions. In release positions of the bars 410, the bobbins may be readily telescoped onto the mandrels 400, the open ended slots in the bobbins engaging and receiving the keys 407 carried by the mandrels properly positioning the bobbins on the mandrels.

After the bobbins are telescoped onto the mandrels 400, the operator depresses the buttons 108 and 108' shown in FIGURE 1 to initiate an indexing movement of the table 20' and a cycle of operations on various pairs of bobbins at the several stations. After the mandrels bearings the bobbins received at the loading station move circumferentially by reason of an indexing movement of the table, the cam follower or roller 436 moves out of engagement with the cam surface 454, releasing the biasing pressure of the springs 420 which is effective to move the rods 406 and the cone-shaped members 416 in left-hand directions as viewed in FIGURE 25.

The cone-shaped surfaces, engaging the angular or canted surfaces 418 formed on the bars 410, move the bars outwardly radially of the axis of the mandrels and securely grip the bobbins under the influence of the pressure of the springs 420. The bars 410 remain in bobbin gripping or holding position until the mandrels bearing the bobbins are moved away from the yarn stripping station 50, the cam follower 436 then engaging the entrant portion or region 456 of the cam 450, the cam surface 454 effecting movement of the rods 406 outwardly radially of the axis of the table 20.

The rods move the cone-shaped members 416 in a right-hand direction as viewed in FIGURE 25 to compress the springs 420 on the bobbin gripping bars 410 and release the holding pressure of the bars 410 on the bobbins. Thus, when the mandrels bearing the stripped bobbins have reached the unloading station, the bobbins are released automatically and are removed from the mandrels by movement of the slide or carriage 356.

The cam contour 454 maintains the bobbin gripping bars 410 in released position during the period of traverse of the mandrels from the unloading station to the loading station and are thus in condition to receive a pair of bobbins.

The apparatus of the invention comprising the various operable components and assemblies hereinbefore described at the several stations are electrically controlled as the actuators therefor are controlled by electrically energized solenoid valves and microswitches of conventional construction.

The manual closing of the switches associated with the switch buttons or knobs 108 and 108' completes a circuit to actuate the table indexing mechanism and through the switch 76 on the indexing mechanism a master circuit is completed to initiate the various operations in the sequence hereinbefore described. Circuits interconnect the microswitches which are actuated as hereinbefore pointed out to energize solenoid actuated valve mechanisms controlling the delivery of compressed air or fluid under pressure to the actuators, and the operation controlling means and devices interconnected to prevent indexing of the table until all of the operations performed at a single indexing are completed.

It is apparent that, within the scope of the invention, modifications and different arrangements may be made other than as herein disclosed, and the present disclosure is illustrative merely, the invention comprehending all variations thereof.

I claim:

1. Apparatus for stripping textile yarns from bobbins including, in combination, a relatively movable member, a mandrel on said member arranged to removably support a bobbin, means for moving said member successively to a plurality of positions, a rotatable yarn severing instrumentality at one of said positions, means for rotating the instrumentality, means operable at the yarn severing position to effect relative lengthwise movement between the rotating yarn severing instrumentality and the bobbin and sever the yarn on the bobbin, and fluid actuated means for ejecting the yarn-free bobbin at another of said positions.

2. Apparatus for stripping filamentary material from bobbins including, in combination, a relatively movable mandrel arranged to removably support a bobbin, means for moving said mandrel successively to a plurality of positions, a rotatable yarn severing instrumentality at one of said positions, means for rotating the instrumentality, means operable at the material severing position to engage the rotating severing instrumentality with material on the bobbin and sever the yarn by movement of the rotating instrumentality lengthwise of the bobbin, means for conveying away the severed material, and fluid actuated means for ejecting the empty bobbin from the mandrel at another of said positions.

3. Apparatus of the character disclosed, in combination, a support, a turret revolvably mounted on the support, a plurality of circumferentially spaced mandrels extending generally radially from the turret, said mandrels arranged to removably receive bobbins containing yarns, means for indexing said turret to successive positions, a rotatable yarn stripping instrumentality disposed at one of said indexed positions, means for rotating the instrumentality, means operable to engage the instrumentality with yarn on a bobbin and move the instrumentality lengthwise of the bobbin for stripping the yarn from the bobbin, and fluid operated ejector means operable at another of said indexed positions for removing the yarn-free bobbins from the mandrels.

4. Apparatus of the character disclosed, in combination, a support, a turret revolvably mounted on the support, a plurality of circumferentially spaced mandrels extending generally radially from the turret, said mandrels arranged to removably receive bobbins containing yarns, means for indexing said turret to a plurality of positions, disc removing means at one of said indexed positions adapted to remove a disc from an end of a bobbin, means at another of said indexed positions to affix a disc in the end of a bobbin, a yarn stripping instrumentality disposed at another of said indexed positions, means operable to engage the instrumentality with yarn on a bobbin and sever the yarn on the bobbin, means for conveying away the severed yarn, and ejector means operable at another indexed position of the turret for removing the yarn-free bobbins from the mandrels.

5. Apparatus of the character disclosed, in combination, a support, a turret revolvably mounted on the support, a plurality of pairs of circumferentially spaced arbors extending generally radially from the turret, said arbors arranged to removably receive bobbins containing yarns, means for indexing said turret to successive positions, means at one of said indexed positions adapted to remove discs from the ends of a pair of bobbins, means at another of said indexed positions to affix discs in the ends of a pair of bobbins, a pair of rotatable cutters disposed at another of said indexed positions, means for rotating the cutters, means operable to concomitantly engage the cutters with yarn on a pair of bobbins and sever the yarn on the bobbins, means for conveying away the severed yarn, and ejector means operable at another indexed position of the turret for removing the yarn-free bobbins from the arbors.

6. Apparatus for conditioning bobbins for reuse, in combination, a support, a member movably mounted on the support, means mounted by said member arranged to receive and support a bobbin, means for moving said member to a plurality of positions, a rotatable yarn severing means disposed at one of the said positions, means for rotating the severing means, means for moving said rotating yarn severing means into engagement with yarn on a bobbin and lengthwise of the bobbin for severing the convolutions of yarn on the bobbin, cam means for guiding said yarn severing means whereby said severing means is maintained out of contact with the bobbin, fluid operated ejector means at another of the said positions operable to remove the yarn-free bobbin from the member, and means for establishing an air stream at the yarn severing position for conveying the severed yarn away from the yarn severing means.

7. Apparatus for stripping yarn from bobbins, in combination, a support, a member movably mounted on the support, a mandrel mounted by said member arranged to receive and support a bobbin, means for retaining a bobbin on the mandrel, means for moving said member to successive positions, a rotatable yarn severing means disposed at one of the said positions, means for rotating the severing means, means for moving said yarn severing means into engagement with yarn on a bobbin and lengthwise of the bobbin for severing the convolutions of yarn on the bobbin, cam means for guiding said yarn severing means whereby said severing means is maintained out of engagement with the bobbin, cam means operable upon movement of said member for releasing the bobbin retaining means, and fluid actuated ejector means at another of the said positions operable to remove the yarn-free bobbin from the mandrel.

8. Apparatus for conditioning bobbins for reuse having yarn identifying discs in ends thereof including, in combination, a support, a bobbin carrier mounted by the support and movable to several positions, means at one of said positions to remove a disc from an end of a bobbin, disc inserting means disposed at another position of the carrier, said disc inserting means including a member arranged to support a stacked supply of discs, means for successively selecting discs from the supply and transferring them to an applying station, means for inserting a selected disc in a bobbin, a yarn stripping means disposed at another of the positions of the carrier, actuating mechanism arranged to engage the stripping means with yarn on the bobbin to remove the yarn therefrom, and means disposed at another of the positions of the bobbin carrier arranged to eject the yarn-free bobbin from the carrier.

9. Apparatus for conditioning bobbins for reuse having yarn identifying discs in ends thereof including, in combination, a support, a bobbin carried mounted by the support and movable to several positions, means at one of said positions to remove a disc from an end of a bobbin, said means including a barb, means for moving the barb to engage the disc and withdraw same from the bobbin, disc inserting means disposed at another position of the carrier, said disc inserting means including a magazine arranged to support a stacked supply of discs, means for successively selecting discs from the supply and transferring them to an applying station, means for inserting a selected disc in a bobbin, a yarn stripping means disposed at another of the positions of the carrier, actuating mechanism arranged to engage the stripping means with yarn on the bobbin to sever the yarn therefrom and means disposed at another of the positions of the bobbin carrier arranged to eject the yarn-free bobbin from the carrier.

10. Apparatus for conditioning bobbins for reuse having yarn identifying discs in ends thereof including, in combination, a support, a bobbin carrier mounted by the support and movable to several positions, means at one of said positions to remove a disc from an end of a bobbin, said means including a plurality of barbed members, an element supporting the barbed members, means for moving the element to impinge the barbed members through the disc and withdraw same from the bobbin, disc inserting means disposed at another position of the carrier, said disc inserting means including a magazine arranged to support a stacked supply of discs, means for successively selecting discs from the supply and transferring them to an applying station, means for inserting a selected disc in a bobbin, a rotatable yarn stripping means disposed at another of the positions of the carrier, means for rotating the stripping means, actuating mechanism arranged to engage the stripping means with yarn on the bobbin to sever the convolutions of yarn, means for conveying the severed yarn away from the bobbin, and means disposed at another of the positions of the carrier arranged to eject the yarn-free bobbin from the carrier.

11. A method of conditioning tubular bobbins for repackaging of filamentary material including the steps of telescoping a bobbin provided with an imperforate material identifying disc in one end and carrying a residue of filamentary material onto a mandrel at a bobbin receiving station, advancing the bobbin to a disc extracting station, projecting an instrumentality through the imperforate disc, withdrawing the instrumentality and the disc from the end of the bobbin, advancing the bobbin to a disc applying station, applying an imperforate material identifying disc to an end of the bobbin at said station, advancing the bobbin to a stripping station, stripping the residue of filamentary material from the bobbin at the stripping station, and conveying the stripped material away from the stripping station.

12. A method of conditioning tubular bobbins for replacing of filamentary material including the steps of telescoping a bobbin provided with an imperforate identifying disc and carrying filamentary material on a mandrel at a receiving station, advancing the bobbin and mandrel to a disc extracting station, engaging the imperforate material identifying disc with an instrumentality, withdrawing the instrumentality and disc from an end of the bobbin, advancing the bobbin and mandrel to a disc applying station, applying an imperforate material identifying disc to an end of the bobbin, advancing the bobbin and mandrel to a stripping station, progressively severing the filamentary material in a direction lengthwise of the bobbin at the stripping station, and entraining the severed material in an air stream and conveying the severed material by the air stream away from the stripping station.

References Cited in the file of this patent

UNITED STATES PATENTS

| | | |
|---|---|---|
| 1,109,949 | Walsh | Sept. 8, 1914 |
| 2,609,876 | Bauer et al. | Sept. 9, 1952 |
| 2,659,547 | Broadbent et al. | Nov. 17, 1953 |
| 2,872,948 | Newbegin et al. | Feb. 10, 1959 |

FOREIGN PATENTS

| | | |
|---|---|---|
| 221,280 | Switzerland | Dec. 16, 1942 |